US008998699B2

(12) United States Patent
Yoshizawa

(10) Patent No.: US 8,998,699 B2
(45) Date of Patent: Apr. 7, 2015

(54) SLOT MACHINE

(75) Inventor: Kazumasa Yoshizawa, Tokyo (JP)

(73) Assignee: Universal Entertainment Corporation, Tokyo (JP)

( * ) Notice: Subject to any disclaimer, the term of this patent is extended or adjusted under 35 U.S.C. 154(b) by 1591 days.

(21) Appl. No.: 12/123,771

(22) Filed: May 20, 2008

(65) Prior Publication Data

US 2008/0318662 A1 Dec. 25, 2008

(30) Foreign Application Priority Data

Jun. 21, 2007 (JP) ................................ 2007-163445

(51) Int. Cl.

*G06F 17/00* (2006.01)
*G06F 19/00* (2011.01)
*G07F 17/34* (2006.01)
*G07F 17/32* (2006.01)

(52) U.S. Cl.

CPC ............ *G07F 17/34* (2013.01); *G07F 17/3244* (2013.01); *G07F 17/3267* (2013.01)

(58) Field of Classification Search

CPC . G07F 17/32; G07F 17/3211; G07F 17/3213; G07F 17/3244; G07F 17/326; G07F 17/3262; G07F 17/3265; G07F 17/3267; G07F 17/3286; G07F 17/34

USPC ........... 463/25, 27, 16–20, 29–31; 273/143 R

See application file for complete search history.

(56) References Cited

U.S. PATENT DOCUMENTS 6,004,207 A * 12/1999 Wilson et al. .................. 463/20
6,312,334 B1 * 11/2001 Yoseloff .......................... 463/25
6,394,902 B1 5/2002 Glavich et al.
6,443,452 B1 * 9/2002 Brune ...................... 273/143 R
6,551,187 B1 4/2003 Jaffe
6,722,979 B2 4/2004 Gilmore et al.
7,147,559 B2 12/2006 Englman
7,258,611 B2 * 8/2007 Bigelow et al. ................ 463/25
7,322,887 B2 * 1/2008 Belger et al. .................... 463/20
7,704,142 B2 * 4/2010 Berman .......................... 463/25

(Continued)

FOREIGN PATENT DOCUMENTS

JP 2002-165926 6/2002
JP 2002-191756 7/2002

(Continued)

OTHER PUBLICATIONS

Philippines patent application publication with search report, in corresponding case; dated Feb. 22, 2010; English translation included.

(Continued)

*Primary Examiner* — Milap Shah
(74) *Attorney, Agent, or Firm* — Lexyoume IP Meister, PLLC

(57) ABSTRACT

A processor executes either of two kinds of game modes, including a base game which is carried out by consuming gaming values in accordance with a bet amount on which the player has placed a bet, and a free game which is carried out without the consumption of any gaming values. If a second scatter symbol 23 is positioned during execution of the base game, a payout amounting to 100 credits is awarded. Alternatively, if the second scatter symbol 23 is positioned in the free game, a payout amounting to 500 credits, which is higher than the value of the payout in the base game, is awarded.

2 Claims, 17 Drawing Sheets

(56) References Cited

U.S. PATENT DOCUMENTS

| | | | | |
|---|---|---|---|---|
| 2003/0027626 | A1* | 2/2003 | Marks et al. | 463/20 |
| 2004/0033827 | A1* | 2/2004 | Gilmore et al. | 463/20 |
| 2004/0053662 | A1* | 3/2004 | Pacey | 463/16 |
| 2004/0053666 | A1* | 3/2004 | Vancura | 463/16 |
| 2004/0072606 | A1* | 4/2004 | Majima et al. | 463/16 |
| 2005/0054419 | A1 | 3/2005 | Souza et al. | |
| 2005/0059476 | A1 | 3/2005 | Vancura | |
| 2006/0068893 | A1* | 3/2006 | Jaffe et al. | 463/20 |
| 2006/0160598 | A1 | 7/2006 | Wells et al. | |
| 2006/0199634 | A1* | 9/2006 | Anderson et al. | 463/20 |
| 2007/0265054 | A1* | 11/2007 | Walker et al. | 463/16 |
| 2007/0275777 | A1* | 11/2007 | Walker et al. | 463/16 |
| 2008/0113779 | A1* | 5/2008 | Cregan | 463/27 |
| 2008/0311973 | A1* | 12/2008 | Jaffe | 463/20 |
| 2011/0117987 | A1* | 5/2011 | Aoki et al. | 463/20 |

FOREIGN PATENT DOCUMENTS

| | | |
|---|---|---|
| JP | 2003-024502 | 1/2003 |
| JP | 2003-180908 | 7/2003 |
| JP | 2004-049408 | 2/2004 |
| JP | 2005-211502 | 8/2005 |
| JP | 2006-006683 | 1/2006 |
| WO | 03020385 | 3/2003 |

OTHER PUBLICATIONS

Macao Official Action from corresponding application, dated Apr. 2, 2010; English translation included.

Japanese Patent and Trademark Office, Office Action of JP 2007-163445, , Feb. 16, 2012, Article 29 (2), Article 36.

* cited by examiner

LINE PAY

| KIND \ NUMBER | 2 | 3 | 4 | 5 |
|---|---|---|---|---|
| 7 | 100 | 200 | 300 | 400 |
| BAR BAR BAR | 50 | 100 | 150 | 200 |
| BAR BAR | 40 | 80 | 120 | 160 |
| BAR | 40 | 80 | 120 | 160 |
|  | 20 | 40 | 60 | 80 |
|  | 20 | 40 | 60 | 80 |
|  | | 10 | 20 | 30 |
|  | | 10 | 20 | 30 |
|  | | 5 | 10 | 15 |
|  | | 5 | 10 | 15 |

SCATTER SYMBOL

| Symbol | Pay |
|---|---|
|  | • BASE GAME :<br>APPEARANCE NUMBER × 20<br>• FREE GAME :<br>APPEARANCE NUMBER × REPEAT WIN |
|  | • BASE GAME :<br>100<br>• FREE GAME :<br>500 |

WILD SYMBOL

| Symbol | Pay |
|---|---|
| WILD | • SUBSTITUTABLE FOR ANY SYMBOL OTHER THAN SCATTER SYMBOL<br>• SHIFTING TO FREE GAME WITH WILD-SYMBOL-INCLUDED WINNING COMBINATION |

SLOT MACHINE

CROSS-REFERENCE TO RELATED APPLICATIONS

This application is based upon and claims a priority from the prior Japanese Patent Application No. 2007-163445 filed on Jun. 21, 2007, the entire contents of which are incorporated herein by reference.

BACKGROUND

1. Field

The slot machine according to one or more aspects of the present invention relates to a slot machine that executes a free game, in addition to a base game, when a predetermined condition has been satisfied during the base game.

2. Description of Related Art

Conventionally, in a slot machine, which is one type of a gaming machine, a game is started by inserting coins, or the like, in the gaming machine. In the game, a symbol string is variably displayed in a predetermined area in the gaming machine, and after the lapse of a predetermined period of time, the symbol string is stopped and displayed. Then, a payout is awarded based on a combination of the symbols thus stopped.

Generally, whether or not a winning combination for which a payout is awarded is established is determined depending on whether a predetermined number of the same kind of symbols (for instance, "CHERRY" and "7") are positioned along a pay line set in advance. Conventionally, if a predetermined number or more of the same kind of symbols are positioned, a payout was also awarded based on the number of symbols thus positioned, irrespective of the pay line.

A large number of conventional slot machines execute two kinds of games, including a base game and a free game. The base game is executed by consumption of a gaming value (coins, credits, etc) corresponding to a bet amount. Alternatively, the free game is executed without consumption of any a gaming value corresponding to the bet amount. Switching from the base game to the free game occurs if a predetermined condition is satisfied, such as the case that a specific symbol (s) is(are) stopped and displayed during the base game. Switching from the free game to the base game occurs if a predetermined condition is satisfied, such as the case that a free game has been carried out by a predetermined number of times.

Further, in a conventional slot machine, the sense of expectancy of the player for a free game is improved by making it easier to establish a combination for which payout is awarded in the free game, as compared to the case of the base game. The specification of U.S. Pat. No. 6,394,902B1 discloses a slot machine in which a total of 15 symbols (3×5) are displayed by employing a video reel. In such a conventional slot machine, the symbol string which is positioned on the reel in the free game is changed from the one used in the base game, and the number of kinds of symbols is reduced from 8 kinds to 5 kinds. Thus, the probability for establishment of a combination for which a payout is awarded during the free game can be apparently increased.

However, in the above-described conventional slot machine, the kind and number of symbols must be changed in the base game and in the free game. Thereby, the this invention can be applied only to a slot machine using video reels. In other words, this technology could not be applied to a slot machine using mechanical reels on the periphery of which the kind and number of symbols were drawn in advance.

In the above-described conventional slot machine, when the kind and number of symbols are changed, a symbol lottery program and a reel control program which differ between the base game and the free game must be executed. This increases the processing load on the processor. Further, changing of the kind of symbols in the base game and the free game requires twice the memory capacity for storing image data corresponding to the symbols.

The object of the present invention is to provide a slot machine in which a higher payout is awarded in a free game, than in the base game, when a first symbol has been positioned in the free game. This makes it possible to reduce the processing load on the processor and minimize the memory storage area, while increasing the sense of expectancy of the player with respect to a free game.

SUMMARY

Therefore, in order to achieve the object, according to a slot machine of the present invention encompassing one or more aspects thereof, there is provided a slot machine. The slot machine comprises a display that displays a plurality of symbols, including a first symbol and a processor. The processor repositions a plurality of symbols on the display. The processor executes a free game if a predetermined condition is satisfied during a base game. The processor awards a first payout if the first symbol is displayed on the display in the base game. The processor awards a second payout, whose value is higher than that of the first payout, if the first symbol is displayed on the display in a free game. As a result, the sense of expectancy of the player with respect to the free game is increased. Also, changing of the kind and number of symbols is no longer required, making it possible to apply this technology to a slot machine using mechanical reels on the periphery of which the type and number of symbols are drawn in advance. Further, the same symbol lottery program and reel control program can be executed both in the base game and the free game, making it possible to reduce the processing load on the processor and minimize the memory storage area.

According to the present invention encompassing one or more aspects, there is provided a slot machine. The slot machine comprises a display that displays a plurality of symbols, including a first symbol and a processor. The processor repositions a plurality of symbols on the display. The processor executes a free game if a predetermined condition is satisfied during a base game. The processor awards a first payout if the first symbol is displayed on the display in the base game. The processor awards a second payout, whose value is higher than that of the first payout, if the first symbol is displayed on the display in a free game. The processor stores a payout that was awarded in a base game in which a predetermined condition for executing the free game has been satisfied. The processor awards a payout of an equivalent value with the payout stored in the process, if a second symbol, which differs from the first symbol, is displayed on the display during the free game. As a result, if a second symbol is displayed in the free game, a so-called repeat win is awarded as a payout. The expectancy of the player with respect to any subsequent free games increases as the payout becomes higher in a game in which a shift condition to the free game has been satisfied. Accordingly, the entertainment characteristic of the slot machine can be increased.

Furthermore, according to the present invention encompassing one or more aspects, there is provided a slot machine. The slot machine comprises a display that displays a plurality of symbols, including a first symbol and a processor. The processor repositions a plurality of symbols on the display.

The processor executes a free game if a predetermined condition is satisfied during a base game. The processor awards a first payout if the first symbol is displayed on the display in the base game. The processor selects, if a predetermined condition for executing a free game has been satisfied, any game mode from at least a first free game mode and a plurality of kinds of game modes, including a second free game mode, based on an operation by a player. The processor executes, if the first free game mode is selected, a first free game in which a second payout is awarded in the free game, a value of the second payout being higher than a value of a first payout awarded in a case where the first symbol is displayed. The processor executes, if the second free game mode has been selected, a second free game in which a third payout is awarded in the free game, a value of the third payout being lower than a value of the second payout awarded in a case where a second symbol is displayed, the second symbol having a higher probability of being repositioned than the first symbol. As a result, the game to be executed can be selected from at least two types of free games, based on the player's selection results, and the payout can be modified based on symbols having different appearance rates in each game. This makes it possible to improve an entertainment characteristic of the slot machine in the free game. The free game can be diversified while executing the same symbol lottery program and the reel control program, which makes it possible to reduce the processing load on the processor and minimize the memory storage area.

BRIEF DESCRIPTION OF THE DRAWINGS

The accompanying drawings, which are incorporated in and constitute a part of this specification illustrate embodiments of the invention and, together with the description, serve to explain the objects, advantages and principles of the invention.

DETAILED DESCRIPTION

Figure 1:
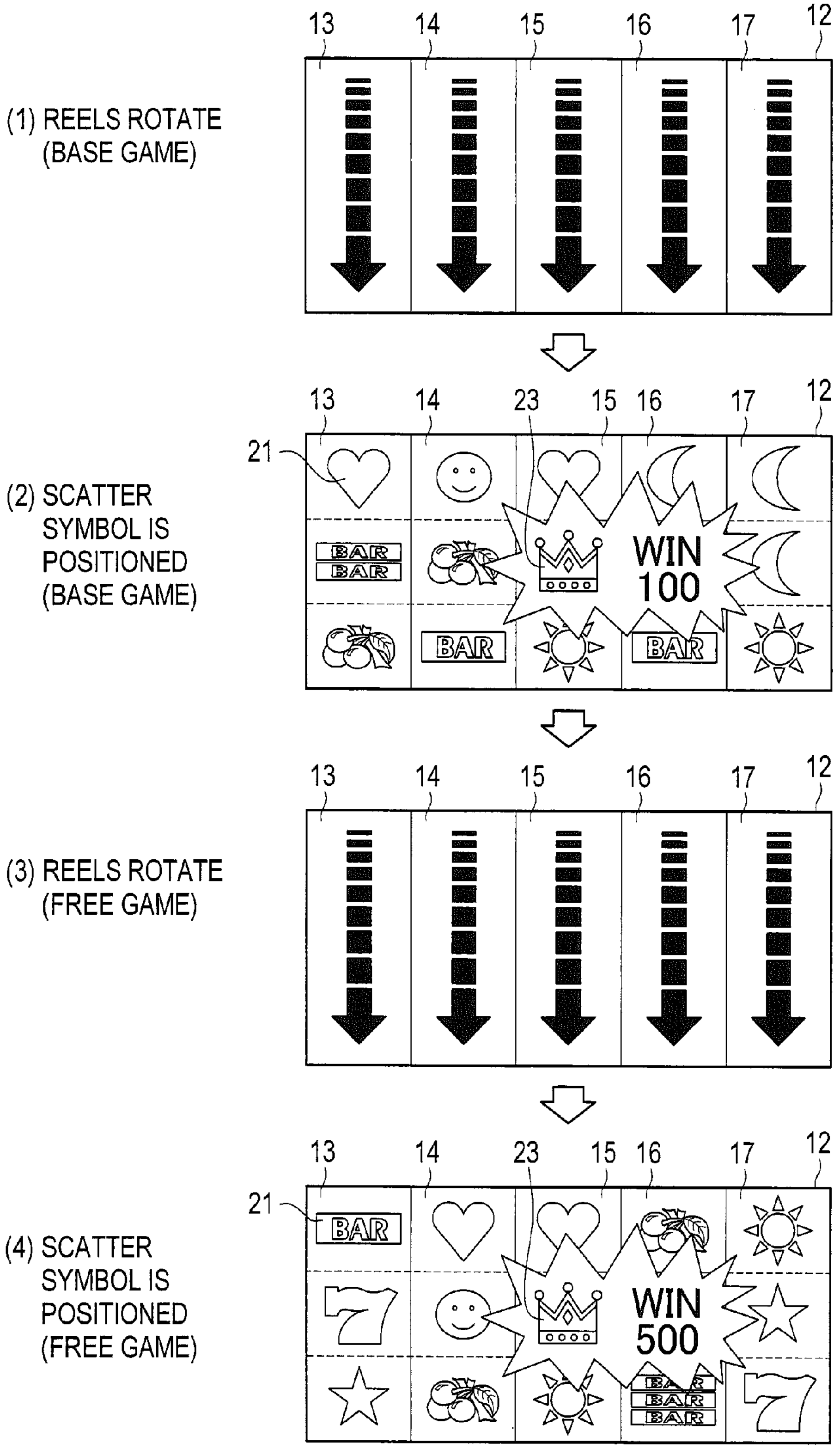
FIG. 1 is an explanatory view showing characteristic part of a slot machine according to the first embodiment of the present invention.

The various aspects summarized previously may be embodied in various forms. The following description shows by way of illustration of various combinations and configurations in which the aspects may be practiced. It is understood that the described aspects and/or embodiments are merely examples, and that other aspects and/or embodiments may be utilized and structural and functional modifications may be made, without departing from the scope of the present disclosure.

It is noted that various connections are set forth between items in the following description. It is noted that these connections in general and, unless specified otherwise, may be direct or indirect and that this specification is not intended to be limiting in this respect.

A slot machine according to one or more aspects of the invention will be described in detail with reference to the drawings based on an embodiment embodying one or more aspects of the invention. However, it is appreciated that one or more aspects of the present invention may be embodied in distributable (via CD and the like) or downloadable software games, console games, and the like. In this regard, the slot machine may be a virtual slot machine that is displayed on a multi-purpose computer and/or dedicated kiosk. Aspects of the invention are described by way of hardware elements. However, it is appreciated that these elements may also be software modules that are executable in a computer. The software modules may be stored on a computer readable medium, including but not limited to a USB drive, CD, DVD, computer-readable memory, tape, diskette, floppy disk, and the like. For instance, aspects of the invention may be embodied in a JAVA-based application or the like that runs in a processor or processors. Further, the terms "CPU", "processor", and "controller" are inclusive by nature, including at least one of hardware, software, or firmware. These terms may include a portion of a processing unit in a computer (for instance, in multiple core processing units), multiple cores, a functional processor (as running virtually on at least one of processor or server, which may be local or remote). Further, in network-based gaming systems, the processor may include only a local processor, only a remote server, or a combination of a local processor and a remote server.

It is contemplated that one or more aspects of the invention may be implemented as computer executable instructions on a computer readable medium such as a non-volatile memory, a magnetic or optical disc. Further, one or more aspects of the invention may be implemented with a carrier signal in the form of, for instance, an audio-frequency, radio-frequency, or optical carrier wave.

Next, a detailed description will be given on a first to fourth embodiment relating to a slot machine according to the present invention, while referring to the accompanying drawings.

First Embodiment

First, a slot machine 1 according to the first embodiment will be described in detail while referring to the drawings. The slot machine according to the first embodiment to be described hereinafter is a so-called video slot machine which has an image display device such as a liquid crystal display and in which a game is played by causing various kinds of symbol images to be displayed onto the image display device.

The slot machine according to the present invention carries out either of two types of game modes. These two game modes include a base game in which gaming values are consumed in accordance with a bet amount on which a bet was placed by the player; and a free game which is carried out without the consumption of any gaming values. The award of a payout during the game is conditioned by the establishment of a predetermined winning combination through the displayed symbols (more specifically, positioning of a predetermined number of or more of a same symbol(s) along a pay line on the display, or positioning of scatter symbols). In particular, in the slot machine according to the present invention, the value of the payout awarded in the case scatter symbols are positioned in the free game is higher than the value of the payout awarded in the case scatter symbols are positioned in the base game.

For instance, FIG. 1 shows an example in which the present invention is applied to a slot machine according to a first embodiment, this slot machine having 5 reels 13 to 17 provided on a display. When a base game is started in the slot machine shown in FIG. 1, the symbol strings on the respective reels 13 to 17 are displayed in a scrolled manner, as shown in FIG. 1 (1). Then, after the lapse of a predetermined period of time, the rotating reels 13 through 17 are stopped in turn, starting from left, and a maximum of 15 symbols 21 are displayed onto the respective symbol display areas as shown in FIG. 1 (2). When a predetermined scatter symbol 23 is positioned, a payout amounting to 100 credits is awarded.

On the other hand, when a wild-symbol-included winning combination is established along the pay line in the base game, the game mode is switched from the base game to the free game, and a free game which will be executed for a predetermined number of times is started. The condition for shifting to the free game may include another condition, as well.

When the free game is started in the slot machine, symbol strings on the respective reels 13 through 17 are displayed in a scrolled manner as shown in FIG. 1 (3), as is the case with the base game. After the lapse of a predetermined period of time, the rotating reels 13 through 17 are stopped in turn, starting from the left, and a maximum of 15 symbols 21 are displayed on the respective symbol display areas as shown in FIG. 1 (4). If a predetermined scatter symbol 23 is positioned, a 500 credit payout, which is higher than the value of the payout in the base game, is awarded.

Figure 2:
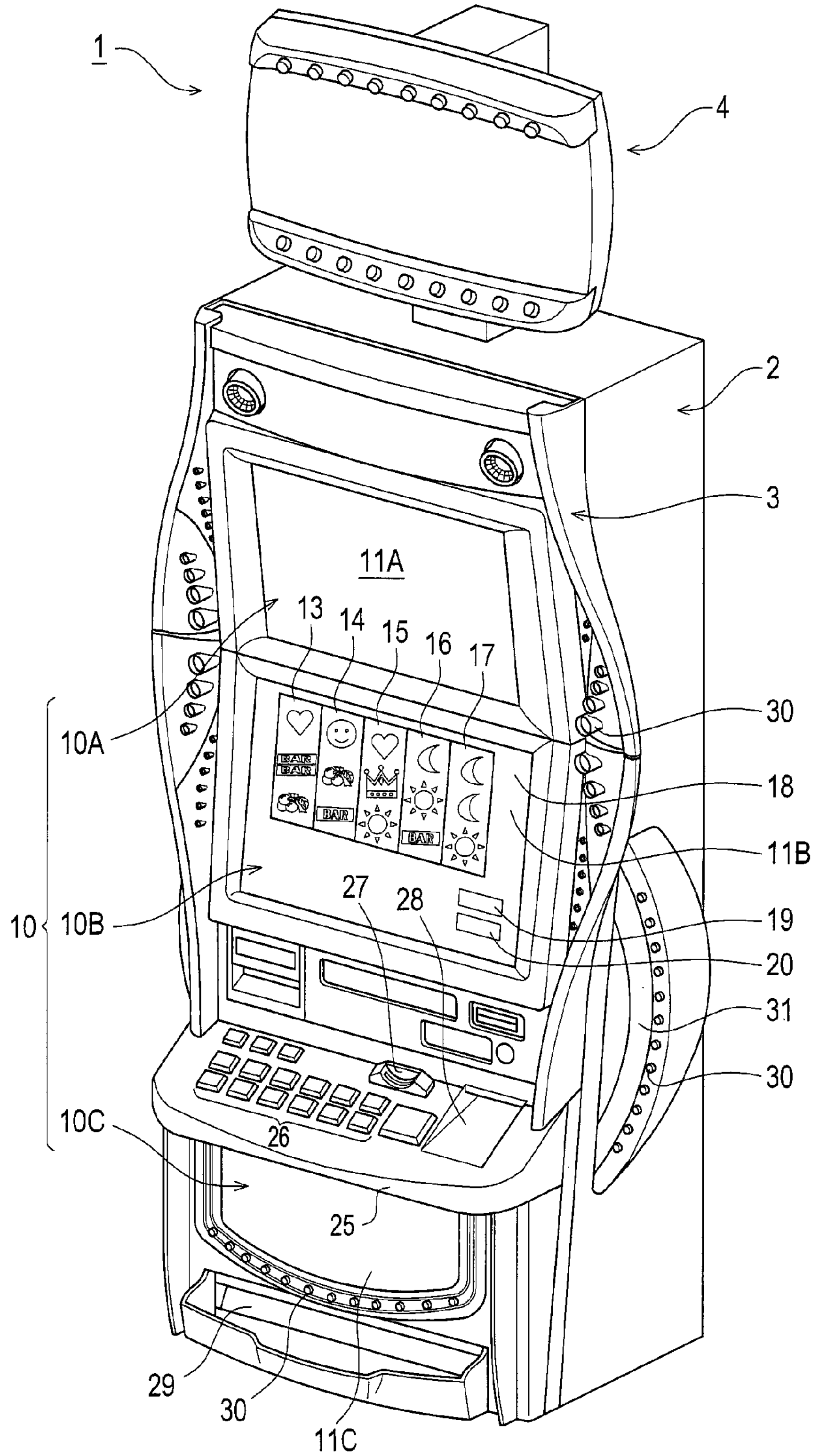
FIG. 2 is a perspective view showing an outer appearance of a slot machine according to the first embodiment of the present invention.

Hereinafter, a schematic configuration of the slot machine 1 according to the first embodiment will be described based on FIG. 2. FIG. 2 is a perspective view showing an outer appearance of the slot machine 1 according to the first embodiment.

The slot machine 1 according to the first embodiment is an upright-type slot machine positioned in a gaming arcade such as a casino or the like. This slot machine 1 has a cabinet 2, a main door 3 provided at a front face of the cabinet 2, and a topper effect device 4 arranged at an upper side of the cabinet 2.

The cabinet 2 is a housing portion that houses electrical or mechanical components. These electrical or mechanical components are used in execution of a predetermined game aspect.

The main door 3 has an upper display portion 10A, a mid-stage variable display portion 10B and a lower display portion 10C, functioning as a display portion 10 that displays information with respect to the game. The upper display portion 10A has an upper liquid crystal panel 11A which is arranged at an upper side of the variable display portion 10B. The upper liquid crystal panel 11A displays, for instance, effect images, an introduction to the game contents, explanation of game rules, payout tables and the like. The lower display portion 10C is arranged at a lower side of the variable display portion 10B and has a plastic panel 11C onto which an image has been printed. This plastic panel 11C is lit up with a backlight.

The variable display portion 10B that displays an execution state of the game has a main liquid crystal panel 11B constituted of a heretofore known transparent liquid crystal panel which is fixedly mounted to the main door 3. Here, the main liquid crystal panel 11B is constituted of a heretofore known liquid crystal panel and has a symbol display portion 12 which comprises a 3×5 symbol display area, at maximum. The symbol display portion 12 is constituted of 5 reels 13 through 17 which are used for a base game. With respect to the respective reels 13 through 17, the symbol strings which have been set in advance are displayed in a scrolled manner and, after the lapse of a predetermined period of time, three symbols 21 are respectively stopped and displayed in each reel. As a result, 15 symbols 21 are displayed in accordance with the progress of the game as will be described later, and a predetermined payout is awarded to the player in accordance with the combination of the displayed symbols 21 and the credit amount (bet amount) thus betted. The number of reels in the base game may be 3, and further, the number of displayed symbols is not limited to 15.

Further, a touch panel 18 is provided at a front face of the main liquid crystal panel 11B. The player can operate the touch panel 18 to input various types of commands.

At a right lower side of the variable display portion 10B, there are provided a payout amount display portion 19 and a credit amount display portion 20. The payout amount display portion 19 displays, as a payout amount, a payout amount to be awarded in the case the symbol combination which is stopped and displayed on the pay line in a base game is a predetermined combination, and an accumulated payout amount acquired in a free game. The credit amount display portion 20 displays the credit amount that the player currently possesses.

The cabinet 2 has an operation table 25 provided at a front face thereof, between the variable display portion 10B and the lower display portion 10C, and bulging out at the front side. On this operation table 25 are arranged various kinds of operation buttons 26, forming an operation unit that commands execution of the game. The buttons 26 include a BET button, a COLLECT button, a START button, a CASHOUT button and the like. The operation table 25 has a coin slot 27 adapted to accept coins, representing gaming values, inside the cabinet 2, and a bill slot 28 adapted to accept bills inside the cabinet 2.

The slot machine 1 according to the first embodiment employs coins, bills or electronic value information (credit) corresponding to these, as gaming values. The gaming values applicable to the present invention are not limited to those described above, and can include, for instance, medals, tokens, electronic money and tickets.

At a lowermost part of the cabinet 2, there is provided a coin tray 29 adapted to accepts coins paid out from the hopper. Further, at a periphery of the cabinet 2 in the slot machine 1, there is arranged a light emitting portion 30 which lights up in a predetermined lighting fashion during the future game, if a win occurs. Further, at a side face of the cabinet 2 is provided a speaker 31 for audio output.

Further, the slot machine 1 has a topper effect device 4 provided at an upper side of the cabinet 2. This topper effect device 4 has a rectangular board shape and is arranged so as to be substantially parallel with the upper liquid crystal panel 11A of the upper display portion 10A.

Figure 3:
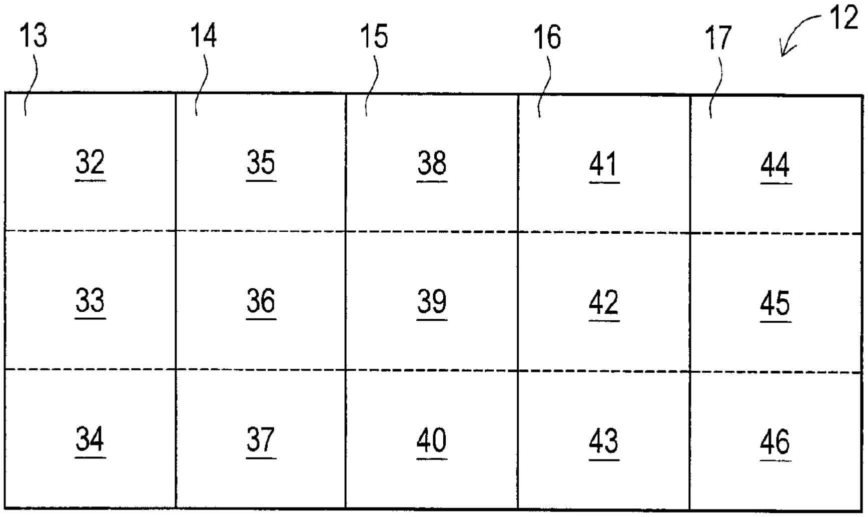
FIG. 3 is a front view showing a symbol display portion of a slot machine according to the first embodiment of the present invention.
Figure 4:
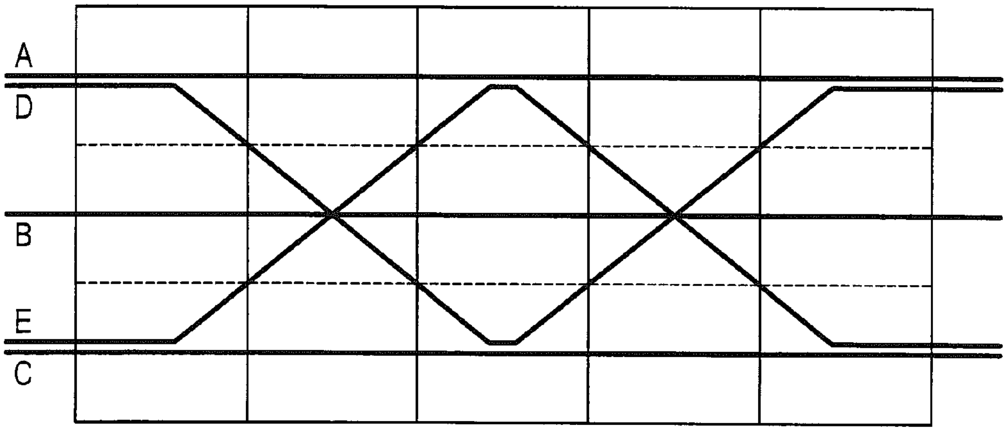
FIG. 4 is a front view showing pay lines A through E set in a slot machine according to the first embodiment of the present invention.
Figure 5:
FIG. 5 is a view showing a list of contents for base symbols and payouts which are used in a slot machine according to the first embodiment of the present invention.
Figure 5:
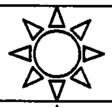
Figure 5:
Figure 5:
Figure 5:
Figure 5:
Figure 6:
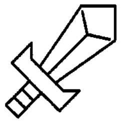
FIG. 6 is a view showing a list of contents for scatter symbols and a wild symbol and payouts which are used in a slot machine according to the first embodiment of the present invention.
Figure 6:
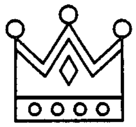

Next, a symbol display portion 12 provided in the main liquid crystal panel 11B and symbols 21 to be displayed on the symbol display portion 12 will be described based on FIG. 3 through FIG. 6. FIG. 3 is a front view showing a symbol display portion 12 in a base game and a free game carried out in a slot machine according to the first embodiment. FIG. 4 is a front view showing pay lines A through E set in the slot machine 1 according to the first embodiment. FIG. 5 and FIG. 6 are views showing a list of the contents for the various symbols and payouts which are used in the slot machine 1 according to the first embodiment.

First, the symbol display portion 12 and symbols 21 displayed on the symbol display portion 12 during the execution of the base game, will be described. The symbol display area 12 in the base game, according to the first embodiment, is constituted of 5 reels 13 through 17. The reels 13 through 17 each have symbol display areas 32 through 46, each symbol display area respectively displaying 3 symbols 21 when the respective rotating reels 13 through 17 are stopped. When a base game or a free game are started, the respective symbol display areas 32 through 46 each display one symbol 21 (total 15 symbols 21), as shown at (1) through (4) in FIG. 1. In the drawing, a dotted line is drawn to divide the respective symbol display areas 32 through 46, however, a configuration is possible where the dotted line is not shown.

Here, symbols 21 to be used in the base game in the slot machine 1 according to the first embodiment are constituted of 13 kinds of symbols and blanks (blank symbols) as shown in FIG. 5 and FIG. 6. Further, the above-mentioned 13 kinds of symbols are made up of 10 kinds of base symbols, two types of scatter symbols and a wild symbol.

The base symbols are made up of 10 kinds of symbols which have a different design, as shown in FIG. 5. The base symbols form a winning combination in the case where the same symbol is positioned by a predetermined number of times along any of the pay lines A through E. The payout value to be paid out differs depending on each kind of symbol.

On the other hand, the scatter symbols shown in FIG. 6 are constituted of a first scatter symbol 22 and a second scatter symbol 23.

The first scatter symbol 22 is included in the symbol string of all reels 13 through 17. If the first scatter symbol 22 is positioned with respect to the symbol display areas 32 through 46, a credit amounting to "appearance number×20" will be paid out in the base game, as a payout. In the free game, credit amounting to "appearance number×repeat win" will be paid out, as a payout. Here, repeat win corresponds to a payout awarded in a game in which a condition for shifting from the base game to a free game is satisfied.

On the other hand, a second scatter symbol 23 is included only in the symbol string of reel 15. If this second scatter symbol 23 is positioned in the symbol display areas 38 through 40, 100 credits will be paid out in the base game as payout. In the free game, 500 credits, which amount is higher than the one in the base game, are paid out as a payout. The random number values for lottery are sorted so as to lower the probability of the second scatter symbol 23 being positioned in the symbol display areas 32 through 46, over the probability of the first scatter symbol 22.

The wild symbol 24 is included only in the symbol strings of reels 15 through 17. If the wild symbol 24 is positioned in the symbol display areas 38 through 46, it is substitutable for any symbol, other than the first scatter symbol 22 and the second scatter symbol 23. Code numbers are allocated, in turn, starting from the top, with respect to each symbol constituting the respective symbol strings positioned on the reels 13 through 17. These code numbers are employed in the symbol lottery process for positioning in the symbol display areas 32 through 46.

In the slot machine 1 according to the first embodiment, a payout is awarded if either of the two following cases occur: (a) in case of a winning combination in which a predetermined number or more of the same kind of symbol 21 are positioned along 5 pay lines A through E as shown in FIG. 4 (here, the wild symbol is substitutable for all symbols, other than the scatter symbols); and (b) in a case where the first scatter symbol 22 or the second scatter symbol 23 are positioned. If a wild symbol-included winning combination is established, after the base game is ended, a free game is executed by a predetermined number of times (for instance, 5 times), the free game being awarded as payout.

In the first embodiment, a winning combination is established if the same kind of symbol is displayed by a predetermined number of times along the pay line shown in FIG. 4, and in the case scatter symbols 22 and 23 have been displayed. In this case, a payout is awarded. A payout may also be awarded for a win in the case the same kind of symbol 21 is displayed by a predetermined number or more times in the symbol display areas 32 through 46, irrespective of the pay line. Also, both a payout depending on the pay line and a payout irrespective of the pay line may be awarded.

Figure 7:
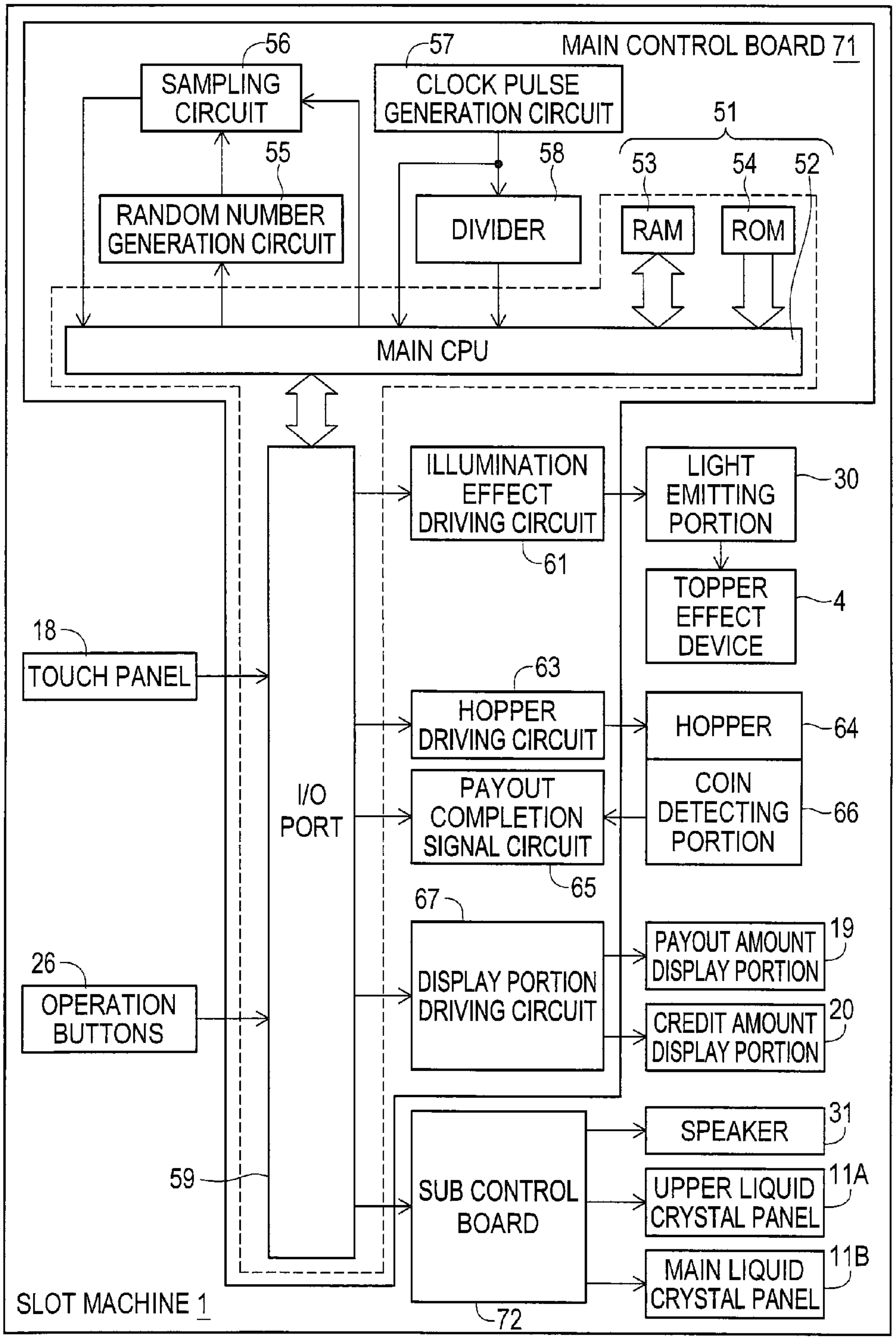
FIG. 7 is a block diagram showing an internal configuration of a entire slot machine according to the first embodiment of the present invention.
Figure 8:
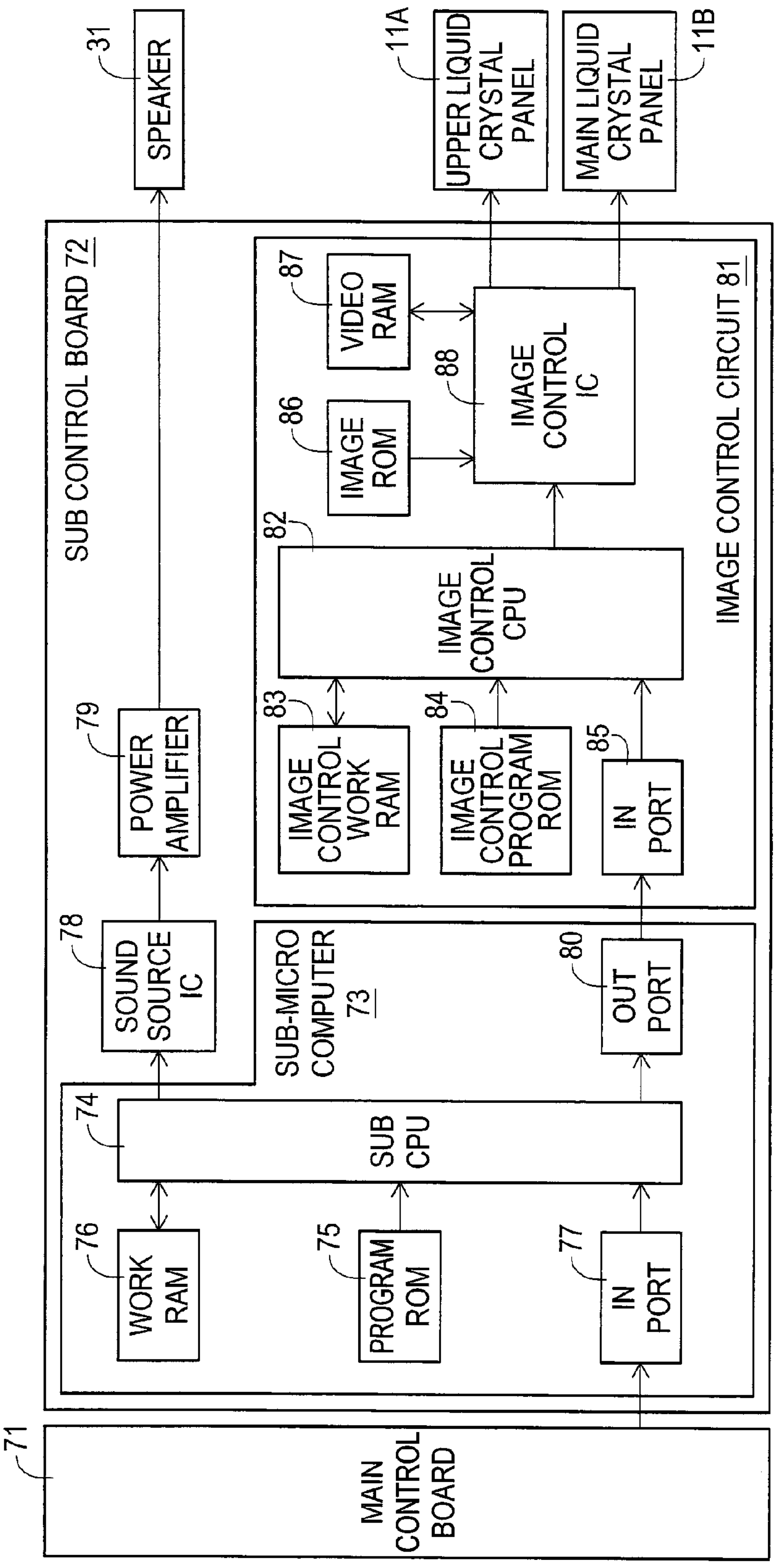
FIG. 8 is a block diagram showing an internal configuration of a sub-control board installed in a slot machine according to the first embodiment of the present invention.
Figure 10:
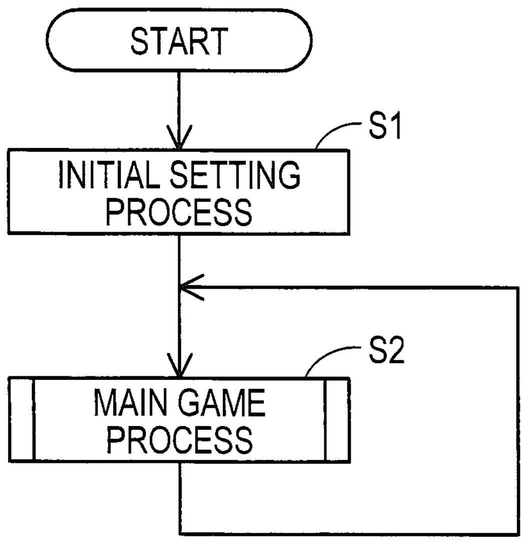
FIG. 10 is a flowchart showing a main control program executed in the slot machine according to first embodiment of the present invention.
Figure 11:
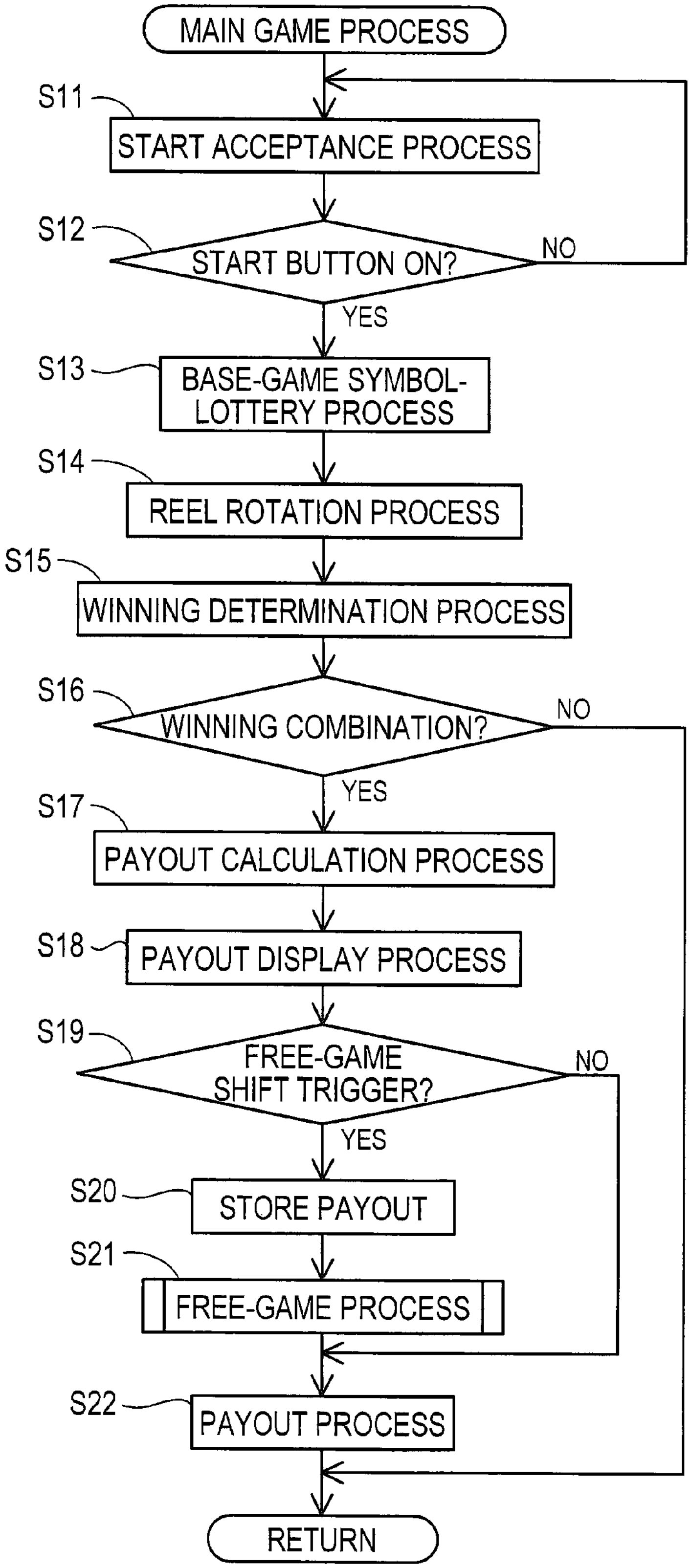
FIG. 11 is a flowchart showing a main game process program executed in the slot machine according to first embodiment of the present invention.
Figure 12:
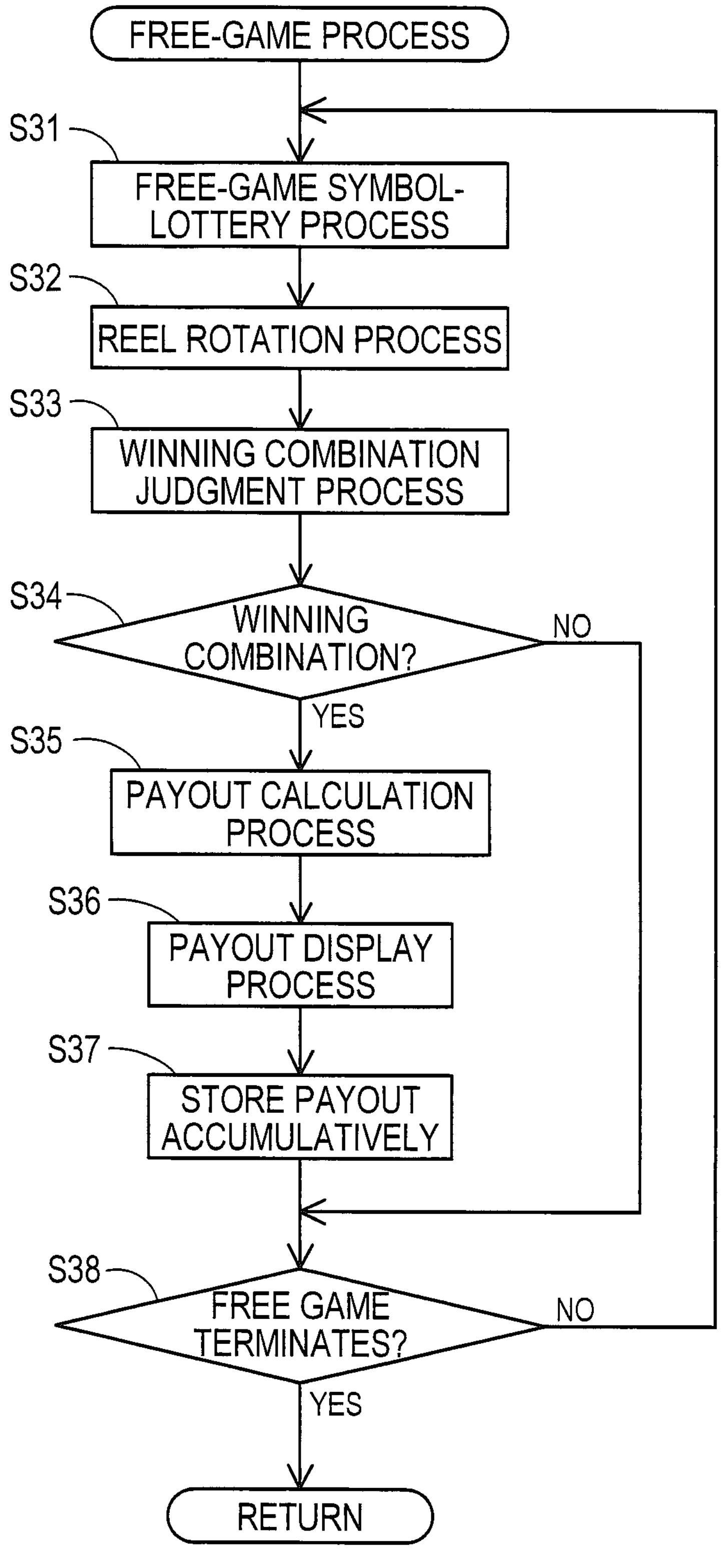
FIG. 12 is a flowchart showing a free game process program executed in the slot machine according to first embodiment of the present invention.

Next, the internal configuration of the above-mentioned slot machine 1 will be described while referring to FIG. 7 and FIG. 8. FIG. 7 is a block diagram showing an internal configuration of the entire slot machine 1. As shown in FIG. 7, the slot machine 1 has a plurality of constituent elements arranged around a main control board 71 including a controller 51 that executes control programs that will be described later (FIG. 10 through FIG. 12). The main control board 71 has a controller 51, a random number generation circuit 55, a sampling circuit 56, a clock pulse generation circuit 57, a divider 58, an illumination effect driving circuit 61, a hopper driving circuit 63, a payout completion signal circuit 65 and a display portion driving circuit 67.

The controller 51 has a main CPU 52, a RAM 53 and a ROM 54. The main CPU 52 operates in accordance with the programs stored in the ROM 54 and performs signal input and output with respect to the other constituent elements through an I/O port 59. Specifically, the main CPU 53 controls the operation of the entire slot machine 1. The RAM 53 stores data and programs to be used when the main CPU 52 is operating. For instance, the RAM 53 temporarily retains the random number values which have been sampled by the sampling circuit 56 after the game has started. The RAM 53 stores code numbers corresponding to the respective reels 13 through 17. The ROM 54 stores various types of programs that will be executed by the main CPU 52, as well as permanent data.

More particularly, the programs stored in the ROM 54 include game programs and game system programs (hereinafter referred to as game programs or the like). Further, the game programs include lottery programs as will be described later.

The lottery programs are used to determined the code numbers for the respective reels 13 through 17 corresponding to the respective symbols which are re-positioned on the pay line B of the main liquid crystal panel 11B. This lottery program includes symbol weighing data for each of the respective 5 reels 13 through 17. The symbol weighing data shows correspondence relationships between the respective code numbers and one or a plurality of random number values within a predetermined number value range (for instance 0 through 255). The probability of lottery with respect to each symbol is set by associating one or a plurality of random number values to one code number. The random number values are drawn by lottery and symbols which have been finally identified from the random number values are re-positioned on the main liquid crystal panel 11B.

The lottery program for determining the symbols to be positioned may also employ weighing data in which the predetermined random number range is associated to the symbol combination. In this case, first, the symbol combination is selected by lottery based on the lottery program, and thereafter, the symbol combination thus determined is re-positioned in the main liquid crystal panel 11B.

The random number generation circuit 55 operates in accordance with the commands from the main CPU 52 and generates random numbers within a predetermined range. The sampling circuit 56 selects, by lottery, an arbitrary random number from the random numbers generated by the random number generation circuit 55 in response to a command from the main CPU 52. At the same time, the sampling circuit 56 inputs the random number thus selected to the main CPU 52. The clock pulse generation circuit 57 generates a reference clock for causing the main CPU 52 to operate. The divider 58 inputs a signal obtained by dividing the reference clock by a constant frequency to the main CPU 52.

The main control board 71 is connected to the touch panel 18. As was described above, the touch panel 18 is arranged at a front face of the main liquid crystal panel 11B and is adapted to identify a coordinate position of the portion that was touched by the player. Specifically, the touch panel 18 can discriminate the portion that the player has touched, and in what direction the touched portion was moved based on the coordinate position information that was thus identified. A signal in accordance with the above discrimination is then inputted to the main CPU 52 through the I/O port 59.

The main control board 71 is connected to the operation button 26, including a START button for commanding execution of a game, a COLLECT button, a BET button and the like. Accordingly, a signal in accordance with a depression operation of these buttons is inputted to the main CPU 52 through the I/O port 59.

The illumination effect driving circuit 61 outputs an effect signal for causing the light emitting portion 30 and the topper effect device 4 as mentioned above to perform illumination effects. The topper effect device 4 is connected in series with the illumination effect driving circuit 61 through the light emitting portion 30.

The hopper driving circuit 63 drives the hopper 64 under the control of the main CPU 52. As a result, the hopper 64 carries out an operation to payout coins to the coin tray 29. The payout completion signal circuit 65 receives coin amount value data from the coin detecting portion 24 to which it is connected. Then, when the received coin amount value has reached the set coin amount value, the payout completion signal circuit 65 inputs a signal that notifies completion of coin payout to the main CPU 52. The coin detecting portion 66 detects the number of coins that were paid out by the hopper 64 and then inputs coin amount value data showing the amount of coins that was detected to the payout completion signal circuit 65. The display portion driving circuit 67 controls the display operation of the respective display portions including the reels 13 through 17, a payout amount display portion 19 and the credit amount display portion 6 and the like.

The main control board 71 is connected to the sub-control board 72. As shown in FIG. 5, the sub-control board 72 carries out display control of the upper liquid crystal panel 11A in the upper display portion 10A and the main liquid crystal panel 11B in the variable display portion 10B, as well as output control of the audio outputted by the speaker 31, based on the commands received from the main control board 71. This sub-control board 72 is constituted on a separate circuit board from the circuit board that constitutes the main control board 71. The sub-control board 72 has a micro computer (hereinafter referred to as "sub-micro computer") 73 which is provided as a main constituting element. Then, the sub-control board 72 has a sound source IC 78, a power amplifier 79, and an image control circuit 81. The sound source IC 78 controls the audio output from the speaker 31. The power amplifier 79 functions as an amplifier. The image control circuit 81 operates as a display control section for the upper liquid crystal panel 11A and the main liquid crystal panel 11B.

The sub-micro computer 73 has a sub-CPU 74, a program ROM 75, a work RAM 76 and I/O ports 77 and 80. The sub-CPU 74 carries out a control operation in accordance with a control command transmitted from the main control board 71. Although the sub-control board 72 does not have a clock pulse generation circuit, a divider, a random number generation circuit and a sampling circuit, it is constituted so as to execute sampling of random numbers based on an operation program of the sub-CPU 74. The program ROM 75 stores a control program to be executed by the sub-CPU 74. The work RAM 76 is constituted as a temporary memory to be used by the sub CPU 74 in executing the control program.

The image control circuit 81 has an image control CPU 82, an image control work RAM 83, an image control program ROM 84, an image ROM 86, a video RAM 87 and an image control IC 88. The image control CPU 82 determines the image to be displayed on the upper liquid crystal panel 11A and the main liquid crystal panel 11B based on the parameters set in the sub-micro computer 73 and the image control programs stored in the image control program ROM 84. For instance, the upper liquid crystal panel 11A displays a payout table and a help screen. The main liquid crystal panel 11B carries out scrolled display and stopped display of the respective symbols 22 through 24 concurrent with the rotation of the reels 13 through 17 in a base game and free game, with respect to the symbol display portion 12.

The image control program ROM 84 stores an image control program and various types of selection tables relating to display on the upper liquid crystal panel 11A and the main liquid crystal panel 11B. The image control work RAM 83 functions as a temporary memory to be used in execution of the image control program in the image control CPU 82. The image control IC 88 forms an image in accordance with the contents determined by the image control CPU 82 and then outputs the image thus formed to the upper liquid crystal panel 11A and the main liquid crystal panel 11B.

The image ROM 86 stores dot data for forming an image. The video RAM 87 functions as a temporary memory to be used by the image control IC 88 in forming an image.

Next, the base game and the free game which are carried out in the slot machine 1 having the above configuration will be described. First, the base game will be described. The base game is a slot game in which a predetermined symbol combination is repositioned on the pay lines A through E on the main liquid crystal panel 11B, through the respective reels 13 through 17. More specifically, the player operates the operation button 26 to set the bet amount, and when he/she depresses the START button, a lottery processing is executed to select, by lottery, the symbols that will be positioned in the symbol display portion 12. After the start button has been depressed and the reels 13 through 17 start rotating following the lapse of a predetermined period of time, the symbol strings are displayed in a scrolled manner. Then, after the lapse of a predetermined period of time, a total of 15 symbols will be stopped and displayed in stages in the symbol display areas 32 through 46.

Here, in the base game, various kinds of winning combinations are determined in advance based on the respective symbol combination re-positioned in the main liquid crystal panel 11B (refer to FIG. 5 and FIG. 6). If a symbol combination corresponding to the winning combination is realized through the symbols re-positioned in the symbol display areas 32 through 46, a gaming value obtained by multiplying the payout corresponding to the winning combination thus established by the bet amount is awarded to the player.

On the other hand, the free game carried out in the slot machine is executed after the game mode has switched from the base game in a case where a winning combination, including the wild symbol 24, has been positioned in the symbol display areas 32 through 46. After the game has been successively carried out by a predetermined number of times (for instance, 5 times), the free game ends and the game mode switches again to the base game. With respect to the procedure of the game, the free game is the same as the base game, except that in the free game, gaming values (credits) corresponding to the bet amount are not consumed at the start of the game, and the game is continuously carried out automatically without requiring the player to operate the operation button 26. Therefore, description of this is hereby omitted. The free game differs from the base game in the payout which is awarded in the case that the first scatter symbol 22 and the second scatter symbol 23 are positioned in the symbol display areas 32 through 46. More specifically, the payout to be awarded in the game in which the conditions for shifting to the free game have been established is stored in the RAM 53. Every time the first scatter symbol 22 is positioned in the symbol display area in the free game, a payout of a value equivalent to the payout stored as a repeat win is paid out.

Figure 9:
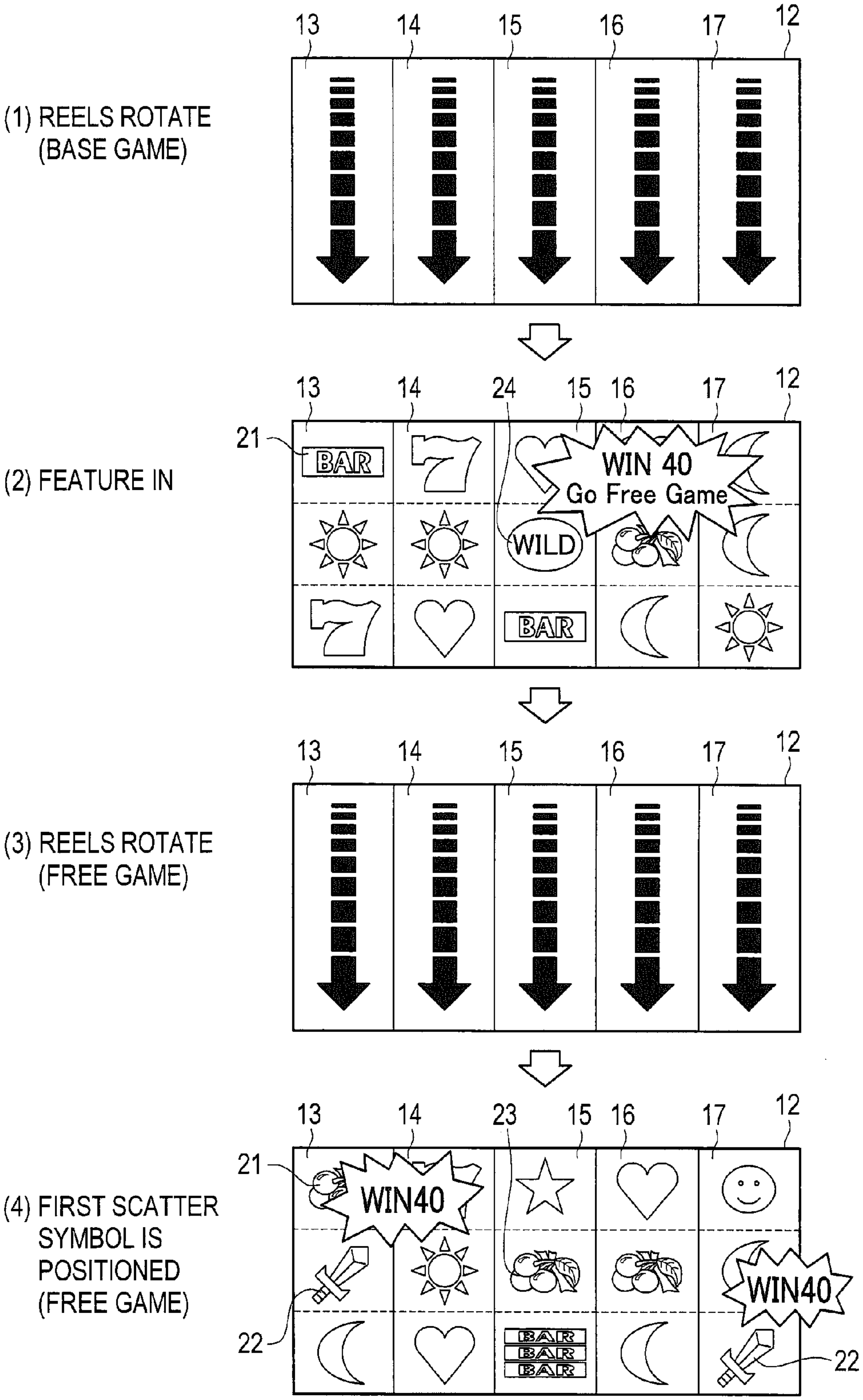
FIG. 9 is an explanatory view showing a base game and a free game which are executed in a slot machine according to the first embodiment of the present invention.

Here, in the example shown in FIG. 9, for instance, if a winning combination has been established through 2 "SUN" symbols and a wild symbol 24 which are positioned in the base game, as shown at (2), a 40-credit payout is awarded and at the same time, a free game is started as the next game. If the first scatter symbol 22 is positioned in 2 symbol display areas in the free game, as shown at (4), an 80-credit payout obtained by multiplying 40 credits, representing a repeat win, by the number of positioned symbols is awarded.

As shown in FIG. 1 at (1) through (4), if a second scatter symbol 23 is positioned in the symbol display area in the free game, a 500-credit payout is awarded, the value of this credit being higher than the payout awarded in the case of this symbol positioning in the base game.

Next, a main control program to be executed in the slot machine 1 according to the first embodiment will be described in detail while referring to the drawings. FIG. 10 is a flow chart showing a main control program.

First, when the power switch is turned on (upon power on), the main control board 71 activates the sub-control board 72 and the controller 51 executes an initial setting process at step (hereinafter referred to as S) 1. In the initial setting process, the main CPU 52 executes the BIOS stored in the ROM 54 and expands the compressed data incorporated in the BIOS in the RAM 53. In executing the BIOS that was expanded in the RAM 53, the main CPU 52 carries out a diagnosis and initialization of the different types of peripheral devices. Further, the main CPU 52 writes the game programs and the like from the ROM 54 into the RAM 53 to acquire payout rate setting data and country identification information. While executing the initial setting process, the main CPU 52 also carries out an authentication process with respect to each program.

Then, at step S2, the main CPU 52 sequentially reads the game programs and the like from the RAM 43 and executes these programs to carry out a main game process. The slot machine 1 according to the present embodiment carries out the game by executing this main game process. The main game process is repeatedly executed while power is supplied to the slot machine 1.

Next, a sub-process of the main game process at the above-described step S2 will now be described based on FIG. 11. FIG. 11 is a flow chart of a main game process program to be executed in the slot machine 1 according to the first embodiment. The programs shown in the flow charts at FIG. 11 and FIG. 12 as will be described later are stored in the ROM 54 and RAM 53 provided in the slot machine 1 and are executed in the main CPU 52.

As shown in FIG. 11, the main CPU 52 first executes a start acceptance process at step S11. In the start acceptance process, the player inserts coins and places a bet using the BET button from amongst the operation buttons 26.

At step S13, the main CPU 52 determines whether or not the start button from amongst the operation buttons 26 has been depressed. This determination is carried out based on the signal inputted to the main CPU 52 in response to depression of the start button. Here, if the start button has not been depressed (S12: NO), the flow returns to the start acceptance process (S11). As a result, the player can carry out an operation to correct, etc. the bet amount. Alternatively, if the start button has been depressed (S12: YES), the main CPU 52 subtracts the bet amount set based on the above-described bet operation from the credit amount that the player currently possesses and at the same time stores the result as bet information in the RAM 53.

At step S13, the main CPU 52 executes a symbol lottery process for the base game. In this symbol lottery process, the main CPU 52 selects, by lottery, the symbols to be positioned on the main liquid crystal panel 11B. More specifically, the main CPU 52 executes the lottery program stored in the RAM 53, thereby sampling a random number value from a number value range within a predetermined random number value range. The main CPU 52 determines the respective 15 symbols (specifically, stop position of reels 13 through 17), from amongst the 13 kinds of symbols, that will be re-positioned in the symbol display areas 32 through 46, based on the sampled random number value and the symbol weighing data.

Next, at step S14, the main CPU 52 carries out a reel rotation process. Specifically, the reels 13 through 17 start rotating and the symbol strings positioned in the respective reels 13 through 17 are displayed in a scrolled manner at a predetermined speed. Then, after the lapse of a predetermined period of time, the rotating reels 13 through 17 are stopped in turn, starting from the left, and one symbol is respectively displayed in each of symbol display areas 32 through 46 (refer to FIG. 1 and FIG. 9). Thus, the symbol combination determined at the above-mentioned step S13 is re-positioned in the symbol display areas 32 through 46 of the main liquid crystal panel 11B.

Then, at step S15, the main CPU 52 carries out a winning determination process to determine whether the symbol combination positioned in the main liquid crystal panel 11B is any of the winning combinations for which a payout is awarded. This determination is carried out based on the code numbers of the respective reels 13 through 17 stored in the RAM 53.

If it is determined, at the above-mentioned step S15 that the winning combination has been established (S16: YES), the flow shifts to step S17. Alternatively, if it is determined that the winning combination has not been established (S16: NO), the main game process is ended. The processes following step S11 are carried out in the case a game is next started.

At step S17, the main CPU 52 calculates a payout based on the winning combination thus established. For instance, if the same kind of symbol has been positioned by a predetermined number of times along any of the pay lines A through E as shown in FIG. 5, a payout is calculated in accordance with the kind of symbols and number of positioned symbols. If a first scatter symbol 22 has been positioned, the payout is calculated at number of positioned symbols×20 credits. If the second scatter symbol 23 has been positioned, the payout is calculated at 100 credits.

Next, at step S18, the main CPU 52 notifies the player by displaying the kind of the winning combination thus established and the contents of the payout with respect to the main liquid crystal panel 11B. For instance, if a "SUN" symbol 21 and 3 wild symbols 24 have been displayed along the pay line B as shown at (2) in FIG. 9, a message "WIN 40" and a message "Go Free Game" are displayed. The former message notifies that 40 credits will be paid out as a payout, and the latter message notifies that the game mode shifts to a free game.

Next, at step S19, the main CPU 52 determines whether or not the trigger for shifting to the free game has been established. More specifically, if the winning combination including the wild symbol 24 has been established, a determination is made that the trigger for shifting to the free game has been established.

As a result, if it is determined that the free-game shift trigger has been established (S19: YES), the value for the payout which will be awarded at present is stored (S20), and then, the flow shifts to the free game process (FIG. 12) as will be described later. The payout which is stored at the above-described step S20 is used as repeat win payout in the free game as will be described later. Alternatively, if it is determined that the free-game shift trigger is not established (S19: NO), the flow shifts to step S22.

At step S22, the main CPU 52 awards a payout to the player in accordance with the winning combination established in the current game, based on the calculation result of the above-described step S17. At this time, the payout can be made using coins corresponding to the credit amount (1 credit corresponds to 1 coin), and the payout can be made using bar-code attached tickets, in response to the depression of the CASH-OUT button from among the operation buttons 26. If a free game has been carried out, a payout which was accumulated during the free game is paid out altogether to the player.

Next, the sub-process for the free game process at the above step S21 will be described based on FIG. 12. FIG. 12 is a flow chart of a sub-process program for the free game process in the slot machine 1 according to the first embodiment.

First, at step S31, the main CPU 52 executes a symbol lottery process for the free game in which a symbol to be positioned on the main liquid crystal panel 11B is selected by lottery. The specific lottery process method is the same as the process at the above-mentioned step S13, and therefore, further description thereof is hereby omitted. The symbol weighing data to be used for symbol lottery in the free game may be the same as that in the base game. Alternatively, data for which the winning combination is established with a higher probability than in the base game may be employed.

Next, at step S32, the main CPU 52 carries out a reel rotation process. Specifically, the reels 13 through 17 start rotating and the symbol strings positioned in the respective reels 13 through 17 are displayed in a scrolled manner at a predetermined speed. Then, after the lapse of a predetermined period of time, the rotating reels 13 through 17 are stopped in turn, starting from the left, and 1 symbol is displayed in each of the symbol display areas 32 through 46 (refer to FIG. 1 and FIG. 9). As a result, the symbol combination as determined at the above-described step S31 is repositioned in the symbol display areas 32 through 46 of the main liquid crystal panel 11B.

Then, at step S33, the main CPU 52 carries out a winning determination process in which a determination is made whether or not the symbol combination positioned on the main liquid crystal panel 11B is any of the winning combinations for which any of the payouts is awarded.

If it is determined at step S33, that the winning combination has been established (S34: YES), the flow shifts to step S35. Alternatively, if it is determined that the winning combination has not been established (S34: NO), the flow shifts to step S38.

At step S35, the main CPU 52 calculates the payout based on the winning combination thus established. For instance, if a predetermined number of the same kind of symbols have been positioned along any of the pay lines A through E, as shown in FIG. 5, a payout is calculated in accordance with the kind of symbol and the number of positioned symbols. If a first scatter symbol 22 has been positioned, number of positioned symbols×repeat win is calculated as a payout. Further, if the second scatter symbol 23 has been positioned, the payout is calculated at 500 credits.

Next, at step S36, the main CPU 52 sends a notification to the player by displaying the kind of the winning combination thus established and the contents of the payout, with respect to the main liquid crystal panel 11B.

Next, at step S37, the main CPU 52 accumulatively stores a payout corresponding to the winning combination established in the current game in the RAM 53, based on the calculation results at the above-described step S35. The payout thus stored is awarded to the player altogether, after the free game ends (S22).

Then, at step S38, the main CPU 52 determines whether or not the free game completion condition has been satisfied. The free game completion condition in the slot machine 1 according to the first embodiment includes execution of five free games after shifting to the free game.

If it is determined that the free game completion condition has been satisfied (S38: YES), the game mode switches from the free game to the base game, and then, the flow shifts to step S22. Alternatively, if it is determined that the free game completion condition is not satisfied (S38: NO), the flow returns to step S31 at which the free game is then executed.

As described in the above text, in the slot machine 1 according to the first embodiment, when the base game is started, the respective reels 13 through 17 start rotating, and after the lapse of a predetermined period of time, the symbols are positioned in the symbol display areas 32 through 46 of the main liquid crystal panel 11B (S14). At this time, if a free-game shift trigger has been established (S16: YES), the free game is executed (S21). If the second scatter symbol 23 is positioned in the free game, a payout amounting to 500 credits, which is higher than the value of the payout in the base game, is awarded to the player (S22). This can increase the expectancy of the player with respect to the free game. Then, the same symbol lottery program and reel control program can be carried out both in the base game and the free game, without the need to change the kind or number of the symbols. This makes it possible to reduce the processing load to the processor and minimize the required storage area in the memory.

The so-called repeat win is awarded as a payout if a first scatter symbol 22 is displayed in the free game. Thus, the expectancy of the player with respect to subsequent free games can be increased as the payout in the game in which the free-game shift condition is satisfied, becomes higher. Accordingly, the entertainment characteristic of the slot machine can be improved.

Second Embodiment

Figure 13:
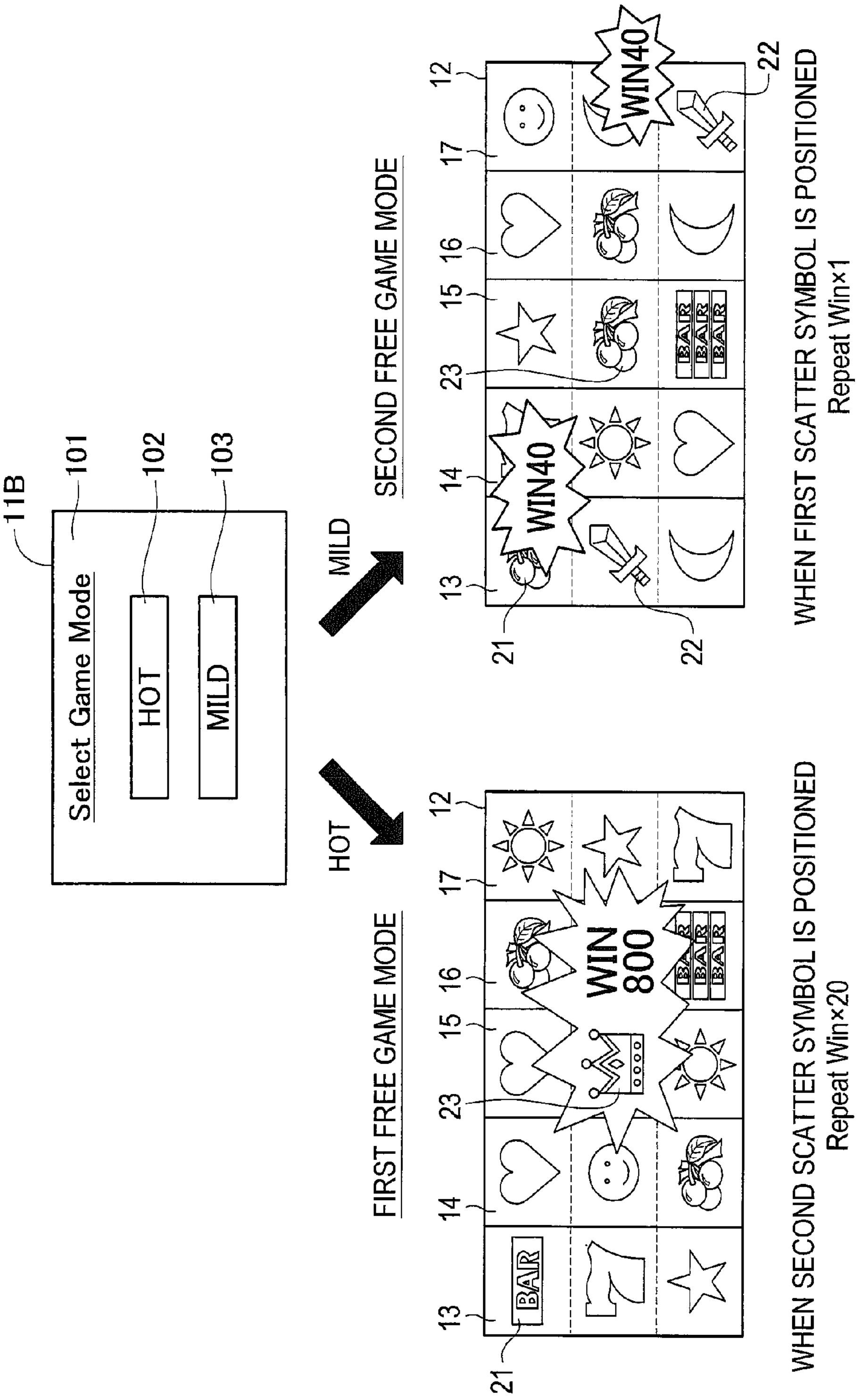
FIG. 13 is an explanatory view showing control of the game in the slot machine according to the second embodiment of the present invention.

Next, a slot machine according to a second embodiment will be described based on FIG. 13. In the description to follow, reference characters which are the same as those for the configuration of the slot machine 1 according to the first embodiment as shown in FIG. 1 through FIG. 12 show the same or corresponding portions in the configuration of the slot machine 1 according to the first embodiment as was described hereinafter.

The schematic configuration of the slot machine according to the second embodiment is substantially the same as the slot machine 1 according to the first embodiment. The various kinds of control processes are substantially the same as those for the slot machine 1 according to the first embodiment.

The slot machine according to the second embodiment differs from the slot machine 1 according to the first embodiment in that after the free game is started, the player is prompted to select either of two game modes including a first free game mode and a second free game mode and a free game corresponding to the selected game mode is executed.

Hereinafter, control of the game in the slot machine according to the second embodiment will next be described using FIG. 13. First, if the main CPU 52 determines that a wild symbol-included winning combination has been established in the base game, specifically, if a condition for executing a free game has been satisfied, a game mode select screen 101 as shown in FIG. 13 is displayed on the main liquid crystal panel 11B.

Here, a "HOT" button 102 and "MILD" button 103 are displayed on the game mode select screen 101. Thus, the player can select either of the above buttons by operating the touch panel 18.

If the main CPU 52 determines that the "HOT" button 102 was selected by the player, a first free game is executed as a free game. Here, if the second scatter symbol 23 is positioned in the symbol display areas 32 through 46 in the first free game, "repeat win×20" will be awarded as a payout. If a first scatter symbol 22 is positioned in the symbol display areas 32 through 46, 50 credits, which value is higher than in the base game, are multiplied by the appearance number, and the resulting amount is paid out as payout.

On the other hand, if the main CPU 52 determines that the "MILD" button 103 has been selected, a second free game is executed as a free game. Here, the second free game has the same contents as the free game executed in the slot machine 1 according to the first embodiment. If the first scatter symbol 22 has been positioned in the symbol display areas 32 through 46, "repeat win×1" is multiplied by the appearance number, and the resulting amount is paid out as a payout. If the second scatter symbol 23 is positioned with respect to the symbol display areas 32 through 46, a payout of 500 credits, which value is higher than that in the base game, is awarded.

On the other hand, whichever the free game mode for the main CPU 52 may be, like is the case with the slot machine 1 according to the first embodiment, sorting of the random number values for the lottery is made so that the probability that the first scatter symbol 22 will be positioned in the symbol display areas 32 through 46 is higher as compared to the second scatter symbol 23.

As was described hereinbefore, if a free game shift trigger has been established in the slot machine according to the second embodiment, a game mode select screen 101 is displayed on the main liquid crystal panel 11B, prompting the player to select whether or not to execute either the first free game or the second free game, as a free game. The payout based on the first scatter symbol 22 and the second scatter symbol 23, which have differing appearance rates are changed in each game, making it possible to improve the entertainment characteristics of the slot machine in the free game. Also, the free game can be diversified while causing execution of the same symbol lottery program and the reel control program, making it possible to reduce the processing load on the processor and minimize the required storage area in the memory.

Third Embodiment

Next, the slot machine according to the third embodiment will now be described based on FIG. 14 through FIG. 15. In the description to follow, reference characters which are the same as those for the configuration of the slot machine 1 according to the first embodiment as shown in the FIG. 1 through FIG. 12 show the same or corresponding portions in the configuration of the slot machine 1 according to the first embodiment.

The schematic configuration of a slot machine according to the third embodiment is substantially the same as that of the slot machine 1 according to the first embodiment. The various kinds of control processes as well, are substantially the same as those in the slot machine 1 according to the first embodiment.

The slot machine according to the third embodiment differs from the slot machine 1 according to the first embodiment in that if the second scatter symbol 23 has been displayed in the symbol display area in the free game, the payout based on the second scatter symbol 23 is gradually increased, and a payout based on the second scatters symbol 23 is awarded once the free game is ended.

Hereinafter, sub-processes for the free game process to be executed in the slot machine according to the third embodiment will be described based on FIG. 14. FIG. 14 is a flow chart for the free game process program in the slot machine according to the third embodiment.

The slot machine according to the third embodiment has two kinds of jackpots (hereinafter referred to as JP) for accumulating a portion of the gaming values on which a bet was placed. More specifically, the slot machine has a storage area provided therein for storing an accumulated amount of the two types of JP ("MAJOR PROG" and "MINI PROG"). This storage area stores 1.0% of the gaming values that the player has betted as an accumulated value "MAJOR PROG". Also, this storage area stores 0.5% of the gaming values that the player has betted as an accumulated value "MINI PROG". The accumulated gaming values will be paid if a the second scatter symbol 23 has been displayed by predetermined number of times in the symbol display area in the free game, as will be described hereinafter.

First, at step S101, the main CPU 52 executes a symbol lottery process of the free game for selecting, by lottery, the symbols that will be positioned in the main liquid crystal panel 11B. The specific lottery process method is the same as the process at the above-described step S13, and therefore, further description thereof will hereby omitted. The symbol weighing data to be used for symbol lottery in the free game may be the same as that for the base game. Also, data for establishing a winning combination with a higher probability than in the base game may also be employed.

Next, at step S102, the main CPU 52 carries out a reel rotation process. Specifically, the reels 13 through 17 start rotating and then, symbol strings positioned on the respective reels 13 through 17 are displayed in a scrolled manner at a predetermined speed. Then, after the lapse of a predetermined period of time, the rotating reels 13 through 17 are stopped in turn, from the left, and one symbol is respectively displayed with respect to each of the symbol display areas 32 through 46. The symbol combination determined at the above-described step S101 is re-positioned in the symbol display areas 32 through 46 of the main liquid crystal panel 11B.

Then, at step S103, the main CPU 52 carries out a winning determination process to determine whether or not the symbol combination positioned in the main liquid crystal panel 11B is any of the winning combinations for which a payout is awarded.

If it is determined at step S103 that the winning combination has been established (S104: YES), the flow shifts to step S105. Alternatively, if it is determined that the winning combination has not been established (S104: NO), the flow shifts to step S109.

At step S105, the main CPU 52 determines whether the second scatter symbol 23 has been displayed with respect to the symbol display areas. If it is determined that the second scatter symbol 23 has not been displayed with respect to the symbol display areas (S105: NO), the flow shifts to step S106. Alternatively, if it is determined that the second scatter symbol 23 has been displayed with respect to the symbol display area (S105: YES), the flow shifts to step S111.

At step S106, the main CPU 52 calculates a payout based on the established winning combination. For instance, if the same kind of symbol has been displayed by a predetermined number of times along any of the pay lines A through E, as shown in FIG. 5, a payout is awarded in accordance to the kind of symbol and the number of positioned symbols. If the first scatter symbol 22 is positioned, number of positioned symbols×repeat win is added as a payout.

Next, at step S107, the main CPU 52 sends a notification to the player by displaying the kind of the established winning combination and the contents of the payout with respect to the main liquid crystal panel 11B.

Next, at step S108, the main CPU 52 accumulatively stores the payout in accordance with the winning combination established in the current game, in the RAM 53, based on the calculation results at step S106. The payout thus stored is paid out once to the player, after the free game ends (S22).

On the other hand, at step S111 which is carried out if it is determined that the second scatter symbol 23 has been displayed with respect to the symbol display area (S105: YES), the main CPU 52 increases the payout based on the second scatter symbol by 1 rank. Here, in the slot machine according to the third embodiment, 5 types of payouts are given based on the second scatter symbol in the free game. These payouts include "100 credits", "500 credits", "1000 credits", "MINI PROG" and "MAJOR PROG". Every time the second scatter symbol 23 is displayed with respect to the symbol display area in the free game, the rank is increased in the following order "100 credits"→"500 credits"→"1000 credits"→"MINI PROG"→"MAJOR PROG", whereby the payout is increased. In this case, the increase rate as well increases when the payout increases. The payout at the end of the free game is awarded to the player, as will be described hereinafter (S112).

As a result, for instance, if the second scatter symbol 23 is displayed only once in the free game, "100 credits" will be awarded as payout at the end of the free game. If the second scatter symbol 23 is displayed two times in the free game, "500 credits" will be awarded as payout at the end of the free game. If the second scatter symbol 23 is displayed three times in the free game, "1000 credits" will be awarded as payout at the end of the free game. If the second scatter symbol 23 is displayed four times in the free game, "MINI PROG", which represents one of the JPs, will be awarded as payout at the end of the free game. Further, if the second scatter symbol 23 is displayed 5 times in the free game, "MAJOR PROG", which represents one of the JPs, will be awarded as payout at the end of the free game.

The current payout based on the second scatter symbol is displayed on the upper liquid crystal panel 11A. Here, FIG. 15 is a view showing a bonus payout screen 110 which is displayed on the upper liquid crystal panel 11A during the execution of the free game in the slot machine according to the third embodiment.

Figure 15:
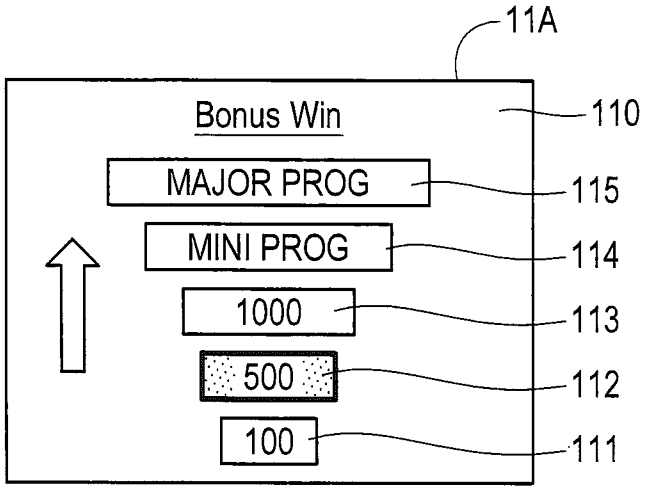
FIG. 15 is a view showing a bonus payout screen during the execution of the free game in the slot machine according to the third embodiment of the present invention.

As shown in FIG. 15, the bonus payout screen 110 displays a payout display portion 111 that shows a "100 credit" payout, a payout display portion 112 that shows a "500 credit" payout, a payout display portion 113 that shows a "1000 credit" payout, a payout display portion 114 that shows a "MINI PROG" payout, and a payout display portion 115 that shows a "MAJOR PROG" payout. In the bonus payout screen 110, any one of the payout display portions 111 through 115 will light up depending on the payout based on the current second scatter symbol. For instance, FIG. 15 shows that the payout based on the current second scatter symbol is "500 credits".

Figure 14:
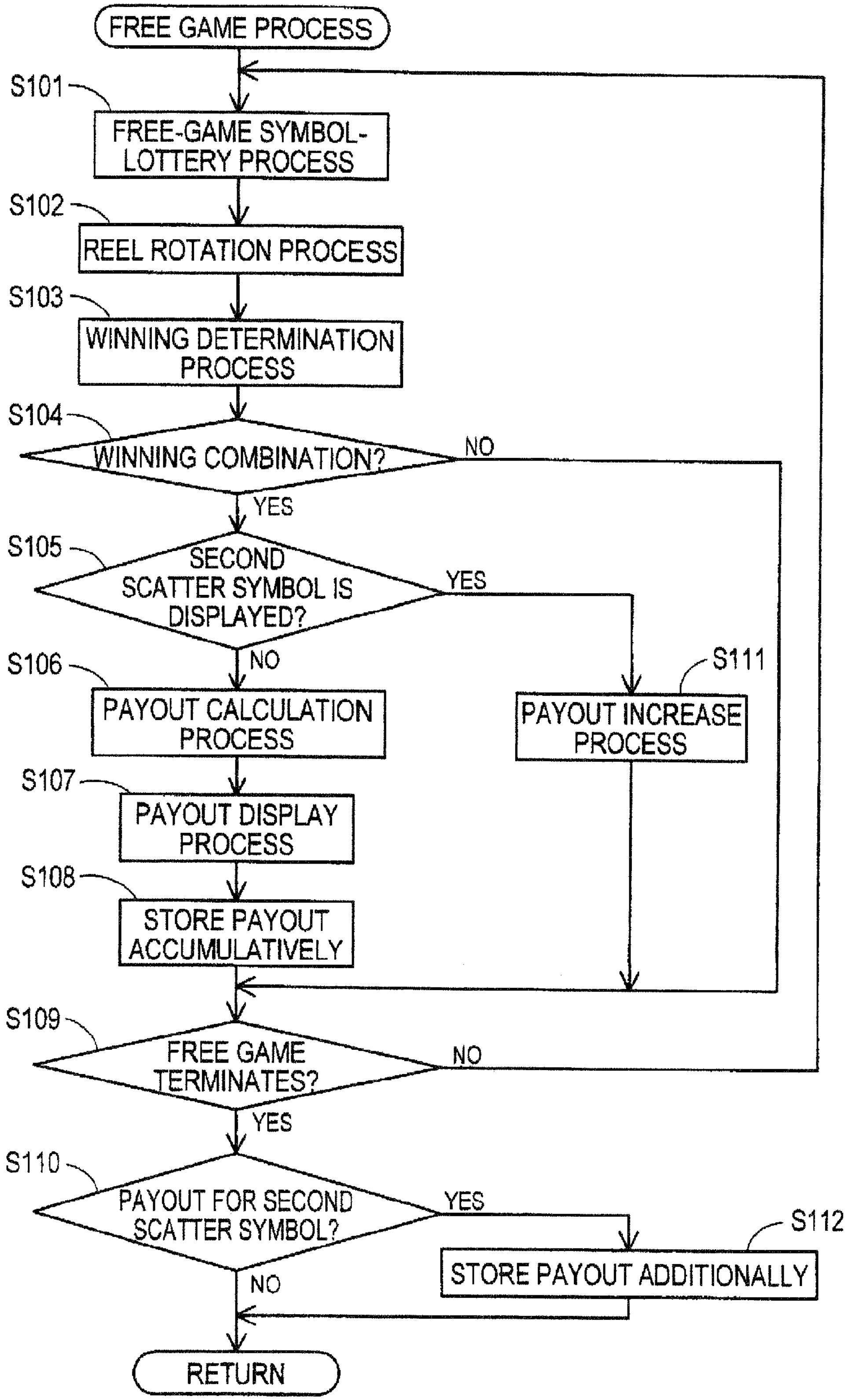
FIG. 14 is a flowchart showing a free game process program executed in the slot machine according to third embodiment of the present invention.

Back to FIG. 14, at step S109, the main CPU 52 determines whether or not the free game completion conditions have been satisfied. The free game completion condition in the slot machine 1 according to the third embodiment includes execution of 5 free games after shifting to the free game.

Then, if it is determined that the free game completion condition has been satisfied (S109: YES), the flow shifts to step S110. Alternatively, if it is determined that the free game completion condition has not been satisfied (S109: NO), the flow returns to step S101 and the free game is successively carried out.

At step S110, the main CPU 52 determines whether or not a payout occurs based on the second scatter symbol 23, in other words, whether or not the second scatter symbol 23 has been displayed by at least one or more times in the free game.

As a result, if it is determined that a payout occurs based on the second scatter symbol 23 (S110: YES), a payout (any of "100 credits", "500 credits", "1000 credits", "MINI PROG", "MAJOR PROG") based on the current rank is additionally stored in the RAM 53. If it is determined that a payout based on the second scatter symbol 23 does not occur (S110: NO), the game mode switches from the free game to the base game, and the flow shifts to step S22.

As was described hereinbefore, in the slot machine 1 according to the third embodiment, each time the second scatter symbol 23 is displayed in the symbol display area in the free game, the value of the payout based on the second scatter symbol 23, which payout is awarded at the end of the free game, is increased, making it possible to award a high payout to the player at one time. Accordingly, the entertainment characteristics of the slot machine can be improved in the free game.

Each time the second scatter symbol 23 is displayed in the free game, the increase rate at which the payout value increases is raised as well, making it possible to offer to the player a sense of expectancy with respect to a payout which becomes higher each time the second scatter symbol 23 is displayed.

In the third embodiment as described hereinbefore, the value of the payout to be granted at the end of the free game is increased each time the second scatter symbol 23 is displayed in the symbol display area in the free game, irrespective of whether the second scatter symbol is displayed successively. However, the value of the payout may be increased only in the case that the second scatter symbol 23 is displayed successively in the free game. More specifically, if the second scatter symbol 23 is displayed successively in two games in the free game, the payout amount is increased from "100 credits" to "500 credits". If the second scatter symbol 23 is displayed successively in three games in the free game, the payout amount is increased from "500 credits" to "1000 credits". If the second scatter symbol 23 is displayed successively in four games in the free game, the payout amount is increased from "1000 credits" to "MINI PROG". Further, if the second scatter symbol 23 is displayed successively in five games in the free game, the payout amount is increased from "MINI PROG" to "MAJOR PROG". In this case, the increase rate at the time the payout increases in accordance with the number of games in which the second scatter symbol 23 is successively displayed increases as well.

The increased payout may be paid out at the end of the free game, or may be paid out if the second scatter symbol 23 has not been displayed successively. Also, the payout based on the second scatter symbol 23 may be returned to the lowest rank, which is "100 credits", if the second scatter symbol 23 has not been displayed successively.

Fourth Embodiment

Next, a slot machine according to a fourth embodiment will be described based on FIG. 16 and FIG. 17. In the description to follow, reference characters which are the same as those for the configuration of the slot machine 1 according to the first embodiment based on the above-described FIG. 1 through FIG. 12 show the same or corresponding portions of the configuration of the slot machine 1 and the like according to the first embodiment.

The schematic configuration of the slot machine according to the fourth embodiment is substantially the same as the configuration of the slot machine 1 according to the first embodiment. The respective kinds of control processes are substantially the same as those in the slot machine 1 according to the first embodiment.

The slot machine according to the fourth embodiment differs from the slot machine 1 according to the first embodiment. They differ in that the player is prompted to select, when all the symbols including the first scatter symbol 22 have been temporarily repositioned in the symbol display area in the free game, between accepting a payout based on the symbols which are currently positioned and repositioning the symbols. Here, if the player has selected to reposition the symbols, the payout based on the symbol combination that has been currently positioned is reset and the reels are rotated again in the same game.

Hereinafter, the free game to be executed in the slot machine according to the fourth embodiment will be described. As is the case with the first embodiment, the game mode switches from the base game to the free game if the winning combination including the wild symbol 24 is positioned in the symbol display areas 32 through 46 in the free game.

Figure 16:
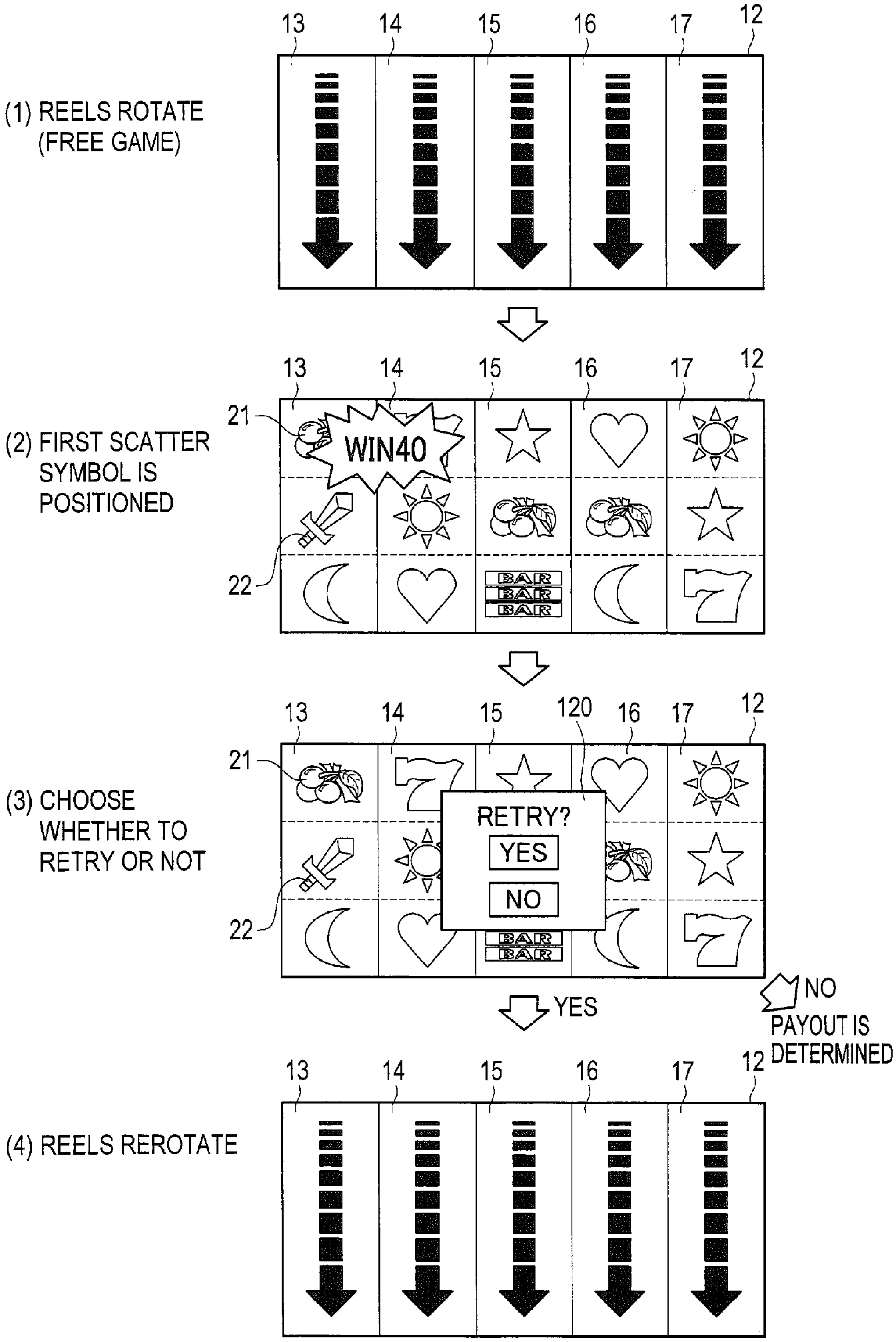
FIG. 16 is an explanatory view showing a base game and a free game which are executed in a slot machine according to the fourth embodiment of the present invention.
Figure 17:
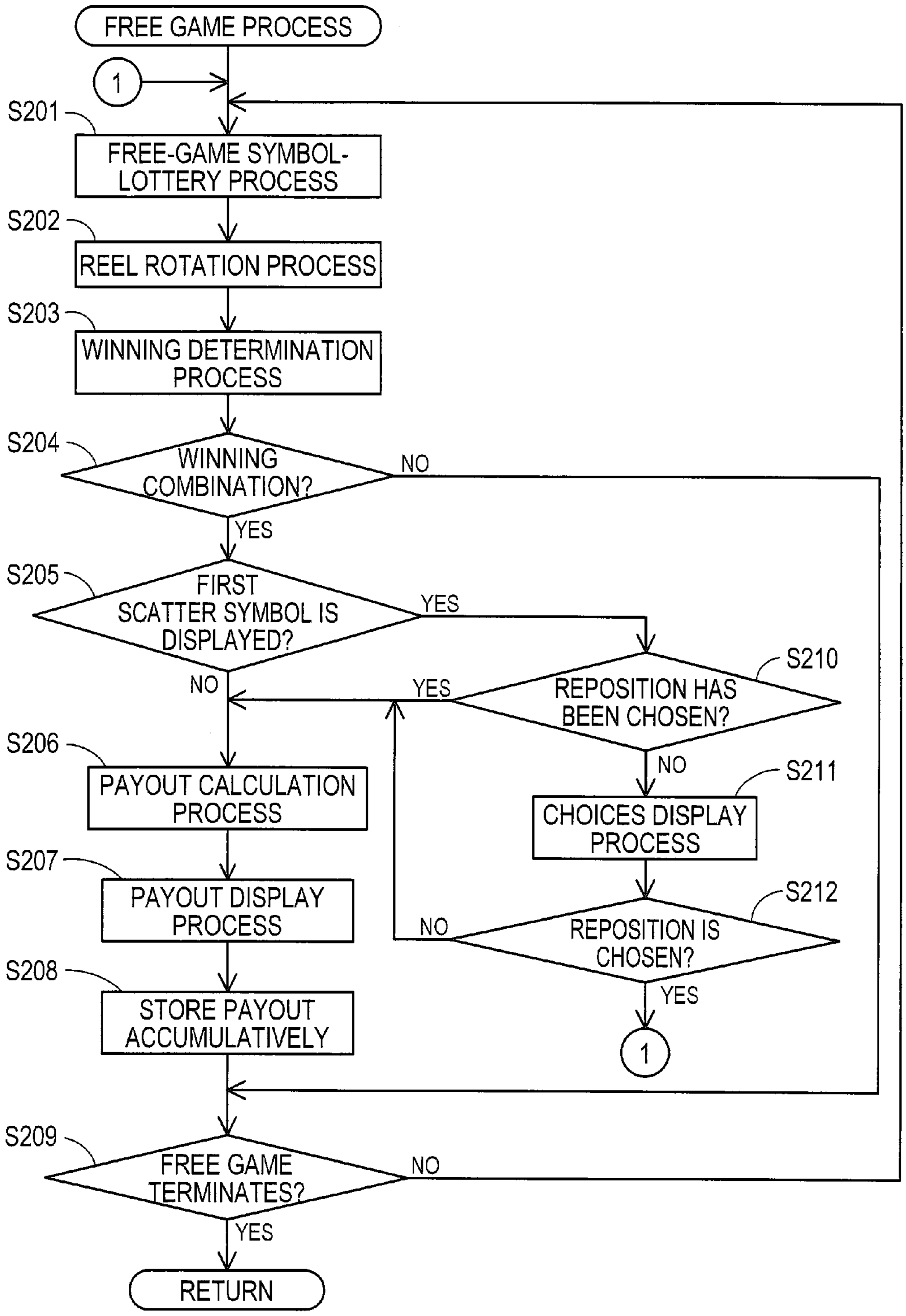
FIG. 17 is a flowchart showing a free game process program executed in the slot machine according to fourth embodiment of the present invention.

As shown at (1) in FIG. 16, the reels 13 through 17 automatically start rotating at a predetermined time interval and the symbol strings are displayed in a scrolled manner. After the lapse of a predetermined period of time, 15 symbols 21 are stopped and displayed in stages in the symbol display areas 32 through 46.

As a result, as shown at (2) in FIG. 16, if the first scatter symbol 22 has been displayed with respect to the symbol display areas 32 through 46, the main liquid crystal panel 11B displays choices 120 prompting the player to select between setting the payout for the current game to a payout corresponding to the current winning combination, or repositioning the symbols, as shown at (3) in FIG. 16.

If the player selects to reposition the symbols, a payout in accordance with the current winning combination is reset, and the reels 13 through 17 are rotated again in the same game. A payout is then awarded based on the symbol combination positioned after the reels 13 through 17 are rotated. Thus, if player is not satisfied with the current payout, he/she aims for a winning combination for which a higher payout is awarded (for instance, positioning of the second scatter symbol 23).

Alternatively, if the player selects to set the current game payout to a payout in accordance with the current winning combination, a payout in accordance with the current winning combination is awarded. Then, the next game is started.

The sub-process of the free game process to be executed by the slot machine according to the fourth embodiment will now be described based on FIG. 17. FIG. 17 is a flow chart of a free game process program in the slot machine according to the fourth embodiment.

First, at step S201, the main CPU 52 executes a symbol lottery process for the free game in which the symbols to be positioned in the main liquid crystal panel 11B are selected by lottery. The specific lottery process method is the same as that for the process at step S13, and therefore, further description thereof is hereby omitted. The symbol weighing data to be used for symbol lottery in the free game may be the same as that in the base game, or otherwise, winning combinations established with a higher probability than in the base game may be used.

Next, at step S202, the main CPU 52 carries out a reel rotation process. Specifically, the reels 13 through 17 start rotating and the symbol strings positioned in each of the reels 13 through 17 are displayed in a scrolled manner at a predetermined speed. Then, after the lapse of a predetermined period of time, the rotating reels 13 through 17 are stopped in turn, starting from the left, and one symbol is respectively displayed in each of the symbol display areas 32 through 46. As a result, the symbol combination determined at the above-described step S201 is re-positioned in the symbol display areas 32 through 46 of the main liquid crystal panel 11B.

Thereafter, the main CPU 52 carries out a winning determination process in which it is determined whether or not the symbol combination positioned in the main liquid crystal panel 11B is any of the winning combinations for which a payout is awarded.

If it is determined at step S203, that the winning combination has been established (S204: YES), the flow shifts to step S205. Alternatively, if it is determined that the winning combination has not been established (S204: NO), the flow shifts to step S209.

At step S205, the main CPU 52 determines whether or not the first scatter symbol 22 has been displayed in the symbol display areas. If it is determined that the first scatter symbol 22 has not been displayed in the symbol display areas (S205: NO), the flow shifts to step S206. On the other hand, if it is determined that first scatter symbol 22 has been displayed in the symbol display areas (S205: YES), the flow shifts to step S210.

At step S206, the main CPU 52 calculates the payout based on the established winning combination. For instance, if the same kind of symbol is positioned by a predetermined number of times along any of the pay lines A through E as shown in FIG. 5, the payout is calculated in accordance with the kind and number of the symbols thus positioned. If the first scatter symbol 22 is positioned, number of positioned symbols× repeat win is computed as a payout. Further, if the second scatter symbol 23 is positioned, the payout is calculated at 500 credits.

Next, at step S207, the main CPU 52 sends a notification to the player by displaying the kind of the established winning combination and the contents of the payout, with respect to the main liquid crystal panel 11B.

Next, at step S208, the main CPU 52 accumulatively stores the payout based on the winning combination established in the current game in the RAM 53 based on the calculation results at step S206. The stored payout is awarded to the player at one time, at the end of the free game (S22).

Then, at step S209, the main CPU 52 determines whether or not the free game completion condition has been satisfied. The free game completion condition in the slot machine 1 according to the fourth embodiment includes execution of 5 free games after shifting to the free game.

If it is determined that the free game completion condition has been satisfied (S209: YES), the game mode switches from the free game to the base game, and the flow then shifts to step S22. On the other hand, if it is determined that the free game completion condition has not been satisfied (S209: NO), the flow returns to step S201 and the free game is successively carried out.

On the other hand, at step S210 which is performed if it is determined that the first scatter symbol 22 has been displayed with respect to the symbol display area (S205: YES), it is determined whether the player has already selected to reposition the symbols in the same game.

If it is determined that the player has already selected to reposition the symbols in the same game (S201: YES), the payout for the current game is set to the payout based on the current winning combination, and then, the flow shifts to step S206. With respect to this, if it is determined that the player has not selected to reposition the symbols in the same game (S210: NO), the flow shifts to step S211. In the fourth embodiment, repositioning of the symbols within the same game, based on the selection of the user can be carried out once only, but it may also be carried out a plurality of times.

At step S211, the main CPU 52 displays choices 120 on the main liquid crystal panel 11B as shown at (3) in FIG. 16.

Then, at step S212, the main CPU 52 determines whether or not the player has selected to reposition the symbols. As a result, if the player has selected to reposition the symbols (S212: YES), the flow returns to step S201, and after the symbol lottery process has been carried out, the reels are rotated again.

On the other hand, if the player has selected to set, at choices 120, the payout to a payout based on the current winning combination (S212: NO), the flow shifts to step S206 and a payout calculation process is carried out.

As was described hereinbefore, in the slot machine 1 according to the fourth embodiment, if the first scatter symbol 22 has been displayed with respect to the symbol display areas 32 through 46 in the free game, the main liquid crystal panel 11B displays choices 120 prompting the player to select whether or not to set the payout for the current game to the payout in accordance with the current winning combination, or reposition the symbols once again (S211). If the player has selected to reposition the symbols, the payout in accordance with the current winning combination is reset and the reels 13 through 17 are rotated once again. If the player is dissatisfied with the game results, symbol repositioning and correction can be carried out based on the selection made by the player. Accordingly, a sense of satisfaction can be granted to the player with respect to the game results of the free game. Also, the chances of granting a high award in the free game are increased, thereby increasing the sense of expectancy with respect to the free game.

The present invention is not limited to the above-described embodiments and various modifications and alterations can be made thereto without departing from the scope of the present invention.

For instance, in the first through fourth embodiments, the conditions for shifting to the free game include establishment of a winning combination including the wild symbol 24. However, the conditions for shifting to the free game may also include other conditions. For instance, the conditions may include the case in which a predetermined number or more of the scatter symbols are stopped and displayed, or such condition may occur unexpectedly, like a mystery.

Figure 18:
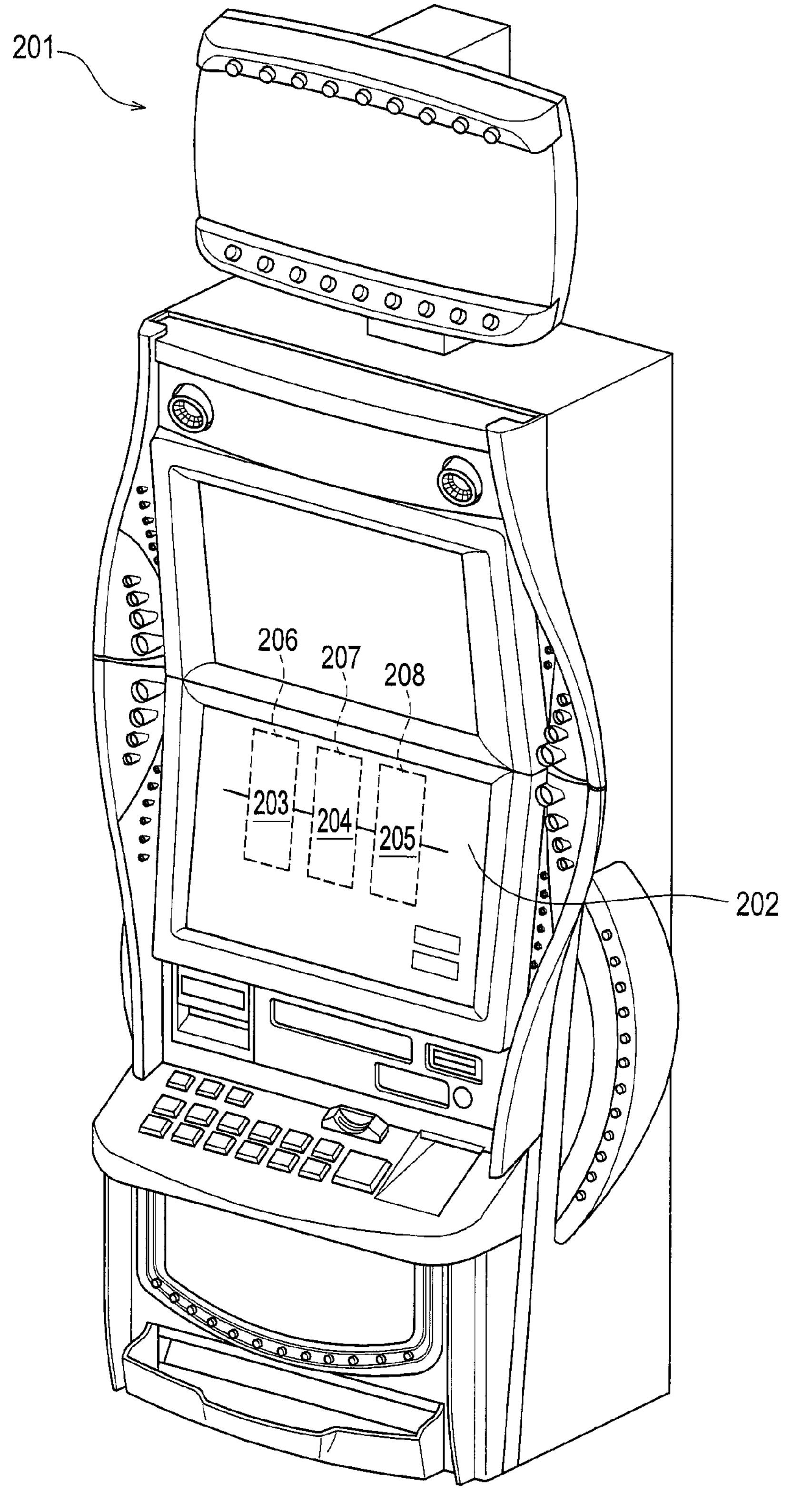
FIG. 18 is a perspective view showing an outer appearance of a slot machine according to another embodiment of the present invention.

The present invention is not limited to video reels only, but is also applicable with respect to slot machines using mechanical reels. For instance, the slot machine 201 shown in FIG. 18 is a so-called hybrid-type slot machine having a heretofore known transparent liquid crystal panel installed at a front face of the plurality of mechanical reels which are rotatably supported, and a game is carried out therein by displaying images of the respective symbols positioned on the outer periphery of the mechanical reels, through the transparent liquid crystal panel.

The slot machine 201 has 3 left reels 203, a center reel 204 and a right reel 205 which are rotatably supported. The respective reels 203 through 205 have symbol strings drawn on their outer periphery, each string being made up of 22 symbols. Further, the respective reels 203 through 205 have, at a front side thereof, a main liquid crystal panel 202 which is made up of a heretofore known transparent liquid crystal panel provided in the main door. Here, the main liquid crystal panel 202 has three display windows 206, 207, and 208 formed therein, the back faces thereof being visible. When the display windows 206, 207 and 208 are in a transparent state, the symbols drawn on each of reels 203 through 205 are visible. On the outer periphery of reels 203 through 205 are drawn symbol strings including the first scatter symbol 22, the second scatter symbol 23 and the wild symbol 24.

In the above-described slot machine 201, the base game may be carried out employing the reels 203 through 205, while the free game may be carried out employing the video reels displayed in the main liquid crystal panel 202.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A slot machine having:

a slot accepting a game medium that provides credits to the slot machine;

a display that displays a plurality of symbols, including a first symbol and a second symbol that is different from the first symbol; and a processor that executes processes comprising:

(a) a process of repositioning the plurality of symbols on the display in a base game when the game medium is accepted by the slot;

(b) a process of executing a free game when a predetermined condition is satisfied during the base game;

(c) in the base game, a process of awarding a first pay out for the first symbol when the first symbol is displayed on the display;

(d) in the free game, a process of awarding a second payout for the first symbol, whose value is higher than that of the first payout for the first symbol, when the first symbol is displayed on the display;

(e) a process of registering, in a storage device, a value of the first payout for the first symbol that is awarded based on the first symbol in an execution of the base game as a second symbol payout when the predetermined condition for executing the free game has been satisfied, a value of the second symbol payout being equal to the value of the first payout for the first symbol; and (f) during the free game, a process of awarding the second symbol payout registered in the storage device in the process at (e) when the second symbol is displayed on the display, wherein during the free game, the second payout for the first symbol and the second symbol payout are not awarded when a symbol other than the first symbol and the second symbol is displayed on the display.

2. A slot machine having:

a slot accepting game medium that provides credits to the slot machine;

a display that displays a plurality of symbols, including a first symbol; and a processor that executes processes comprising:

(a) a process of repositioning the plurality of symbols on the display in a base game when the game medium is accepted by the slot;

(b) a process of awarding a first payout when the first symbol is displayed on the display in the base game, (c) a process of executing a free game when a predetermined condition is satisfied during the base game;

(d) a process of displaying a content of a second payout when the first symbol is displayed on the display in the free game;

(e) a process of determining whether or not a selection of a retrial for repositioning the plurality of symbols is recorded, when the first symbol is displayed on the display in the free game;

(f) a process of awarding the second payout when it is determined the selection of the retrial for repositioning the plurality of symbols is recorded;

(g) a process of displaying a first option for selecting the second payout and a second option for resetting the second payout and executing the retrial for repositioning the plurality of symbols when it is determined that the selection of the retrial for repositioning the plurality of symbols is not recorded;

(h) a process of determining which one of the first option and the second option is selected;

(i) a process of awarding the second payout when it is determined that the first option is selected;

(j) a process of repositioning the plurality of symbols without awarding the second payout when it is determined that the second option is selected; and (k) a process of recording the selection of the retrial for repositioning the plurality of symbols when it is determined that the first option is selected.

* * * * *